United States Patent
Okamoto

(10) Patent No.: US 8,422,478 B2
(45) Date of Patent: *Apr. 16, 2013

(54) RADIO TRANSMISSION DEVICE

(75) Inventor: Naoki Okamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/885,264

(22) Filed: Sep. 17, 2010

(65) Prior Publication Data

US 2011/0009079 A1 Jan. 13, 2011

Related U.S. Application Data

(62) Division of application No. 11/663,668, filed as application No. PCT/JP2005/017303 on Sep. 20, 2005.

(30) Foreign Application Priority Data

Sep. 27, 2004 (JP) .................................. 2004-279267

(51) Int. Cl.
*H04B 1/38* (2006.01)
*H04J 1/00* (2006.01)
*H04J 11/00* (2006.01)
*H04J 9/00* (2006.01)

(52) U.S. Cl.
USPC ........... 370/343; 370/208; 370/210; 370/203; 370/204; 370/205; 370/206; 455/73

(58) Field of Classification Search ............... 455/73; 370/343, 208, 23–206, 210
See application file for complete search history.

(56) References Cited

U.S. PATENT DOCUMENTS

| 5,533,096 | A | 7/1996 | Bales |
| 5,942,750 | A | 8/1999 | Sannerhaugen et al. |
| 6,473,467 | B1 | 10/2002 | Wallace et al. |
| 7,069,041 | B2 * | 6/2006 | Doi et al. ................. 455/525 |

(Continued)

FOREIGN PATENT DOCUMENTS

| EP | 1185001 A2 | 3/2002 |
| JP | 2003-032226 A | 1/2003 |

(Continued)

OTHER PUBLICATIONS

Hui Shi et al., Institute of Electronics, Information and Communication Engineers general meeting, 2004, B-5-23, p. 510.

(Continued)

*Primary Examiner* — Bobbak Safaipour
(74) *Attorney, Agent, or Firm* — Birch, Stewart, Kolasch & Birch, LLP

(57) ABSTRACT

To obtain maximum throughput in accordance with characteristics of a propagation path, a radio transmission device having a plurality of transmitting antennas (18a, 18b) for transmitting a transmission signal in units of sub-carriers by performing spatial multiplexing or without performing spatial multiplexing is provided that includes a sub-carrier modulation part 11 modulating the input transmission signal for each sub-carrier, a transmission signal allocation part 13 allocating the transmission signal modulated for each of the sub-carriers to each of the transmitting antennas, and a transmission control part 12 that determines a multiplexing number for performing spatial multiplexing for each sub-carrier based on information received from another radio communication device as an opposite party, and outputs the determined multiplexing number to the sub-carrier modulation part and the transmission signal allocation part.

12 Claims, 20 Drawing Sheets

U.S. PATENT DOCUMENTS

| | | | |
|---|---|---|---|
| 7,366,515 | B2 | 4/2008 | Zhao et al. |
| 7,408,976 | B1 | 8/2008 | Narasimhan et al. |
| 7,623,441 | B1 | 11/2009 | Sampath et al. |
| 7,751,369 | B2 | 7/2010 | Kishigami et al. |
| 7,948,960 | B2 | 5/2011 | Okamoto |
| 2002/0122381 | A1 | 9/2002 | Wu et al. |
| 2002/0122383 | A1* | 9/2002 | Wu et al. ........................ 370/210 |
| 2002/0154705 | A1 | 10/2002 | Walton et al. |
| 2002/0165969 | A1 | 11/2002 | Gallant |
| 2003/0153339 | A1 | 8/2003 | Crockett et al. |
| 2003/0153341 | A1 | 8/2003 | Crockett et al. |
| 2004/0081131 | A1* | 4/2004 | Walton et al. .................. 370/344 |
| 2005/0135386 | A1 | 6/2005 | Shores et al. |
| 2005/0163082 | A1 | 7/2005 | Sudo |
| 2005/0185575 | A1 | 8/2005 | Hansen et al. |
| 2006/0072517 | A1 | 4/2006 | Barrow et al. |
| 2006/0193298 | A1 | 8/2006 | Kishigami et al. |
| 2006/0221808 | A1* | 10/2006 | Shirakata et al. ............. 370/203 |
| 2006/0225108 | A1 | 10/2006 | Tabassi et al. |
| 2007/0025464 | A1 | 2/2007 | Perlman |
| 2007/0041457 | A1* | 2/2007 | Kadous et al. ................ 375/260 |
| 2007/0202818 | A1 | 8/2007 | Okamoto |
| 2008/0125123 | A1 | 5/2008 | Dorenbosch et al. |
| 2008/0186915 | A1* | 8/2008 | Kim et al. ..................... 370/329 |
| 2009/0172138 | A1 | 7/2009 | Wang et al. |
| 2009/0175214 | A1 | 7/2009 | Sfar et al. |
| 2010/0027475 | A1 | 2/2010 | Kishigami et al. |
| 2010/0034299 | A1* | 2/2010 | Love et al. .................... 375/260 |
| 2010/0061360 | A1 | 3/2010 | Chen et al. |
| 2010/0074237 | A1 | 3/2010 | Ahn et al. |
| 2010/0080323 | A1* | 4/2010 | Mueck et al. ................. 375/296 |
| 2010/0106797 | A1 | 4/2010 | Nagaraja |
| 2011/0110444 | A1 | 5/2011 | Roh et al. |
| 2011/0255503 | A1 | 10/2011 | Okamoto |
| 2012/0002746 | A1 | 1/2012 | Pham |
| 2012/0120925 | A1 | 5/2012 | Kadous et al. |
| 2012/0140798 | A1 | 6/2012 | Kadous et al. |
| 2012/0140838 | A1 | 6/2012 | Kadous et al. |

FOREIGN PATENT DOCUMENTS

| | | | |
|---|---|---|---|
| JP | 2003/204317 | A | 7/2003 |
| JP | 2003-530010 | A | 10/2003 |
| JP | 2003-318853 | A | 11/2003 |
| JP | 2004-120730 | A | 4/2004 |
| JP | 2005-65242 | | 3/2005 |
| WO | WO 01/76110 | A3 | 10/2001 |
| WO | WO 2004/039027 | A2 | 5/2004 |

OTHER PUBLICATIONS

S.T. Chung et al., Vehicular Technology Conference, 2001. VTC 2001 Fall. IEEE VTS 54th, vol. 2, pp. 910-914, 2001.

Bauch, "Space-Time Block Codes Versus Space-Frequency Block Codes", 57th IEEE Vehicular Technology Conference Proceedings, vol. 1, Apr. 22, 2003, pp. 567-571, New York, NY, US, XP010862071.

Extended European Search Report for Application No. 05785963.9 dated Jul. 13, 2012.

Extended European Search Report for Application No. 11156427.4 dated Jul. 12, 2012.

Extended European Search Report for Application No. 11173661.7 dated Jul. 12, 2012.

Kim et al., "An Adaptive Multiple Antenna Transmission Scheme for an OFDMA System", International Conference on Commmunication Technology Proceedings, ICCT 2003, vol. 2, Apr. 9, 2003, pp. 1377-1380, Piscataway, NJ, US, XP010644105.

Sampath et al., "A Simple Scalable Space-Frequency Coding Scheme for MIMO-OFDM", 2004 IEEE 60th Vehicular Technology Conference, vol. 1, Sep. 26, 2004, pp. 640-644, Piscataway, NJ, US, XP010788455.

Vandenameele et al., "A Combined OFDM/SDMA Approach", IEEE Journal on Selected Areas in Communications, vol. 18, No. 11, Nov. 2000, pp. 2312-2321, Piscataway, NJ, US, XP011055272.

Xia et al., "Adaptive MIMO-OFDM Based on Partial Channel State Information", 2003 4th IEEE Workshop on Signal Processing Advances in Wireless Communications, Jun. 15, 2003, pp. 551-555, Piscataway, NJ, US, XP010713431.

Maeda et al., "Experimental Evaluation of Throughput Performance in Broadband Packet Wireless Access Based on VSF-OFCDM and VSF-CDMA," Personal, Indoor & Mobile Radio Comm.PIMRC 2003 14th IEEE (Sep. 7-10, 2003) pp. 5/10 to 10/10.

U.S. Office Action, dated Sep. 16, 2011, for U.S. Appl. No. 13/168,550.

U.S. Office Action issued in U.S. Appl. No. 11/663,668, dated May 14, 2010.

U.S. Office Action issued in U.S. Appl. No. 11/663,668, dated Oct. 21, 2009.

U.S. Office Action issued in U.S. Appl. No. 13/168,550, dated Apr. 26, 2012.

Supplemental European Search Report issued in European Patent Application No. 05785963.9 on Oct. 22, 2012.

U.S. Notice of Allowance issued in U.S. Appl. No. 13/168,550 on Dec. 10, 2012.

* cited by examiner

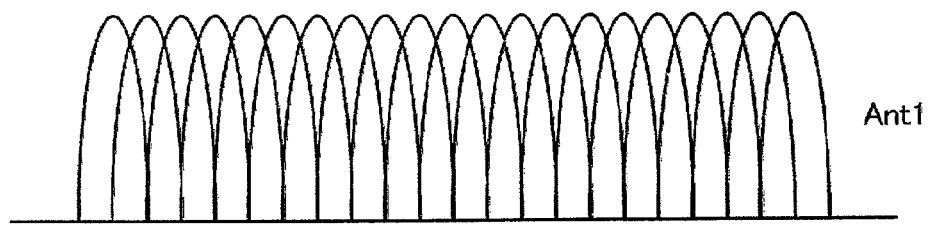
(a) WHEN TRANSMITTING DIFFERENT SIGNALS
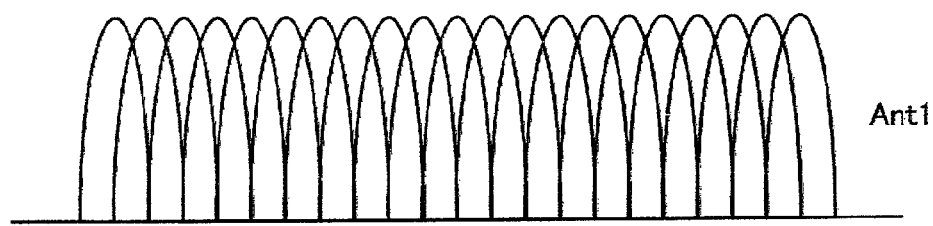
(b) WHEN TRANSMITTING IDENTICAL SIGNALS
FIG. 20

RADIO TRANSMISSION DEVICE

This application is a Divisional of co-pending application Ser. No. 11/663,668 filed on Mar. 23, 2007 which is a National Phase of PCT/JP2005/017303 filed on Sep. 20, 2005, and for which priority is claimed under 35 U.S.C. §120; and these applications claim priority of Application No. JP2004-279267 filed in Japan on Sep. 27, 2004 under 35 U.S.C. §119; the entire contents of all are hereby incorporated by reference

TECHNICAL FIELD

The present invention relates to a radio communication device that applies a multi-input multi-output (MIMO) technology using a plurality of transmitting-receiving antennas.

BACKGROUND ART

In recent years, research on spatial multiplexing technology using characteristic properties of propagation space has been pursued to investigate increases in transmission capacity. Among the spatial multiplexing technologies, a technology in which a different signal is transmitted from each of a plurality of transmitting antennas and signals are received by a plurality of receiving antennas to separate a received signal is called a multi-input multi-output (MIMO) technology. The MIMO technology is a system that transmits and receives different signals by multiplexing them in space depending on transfer functions on a plurality of propagation paths and different signals are transmitted separately by different antennas, but if there is a strong antenna correlation in which the transfer functions are similar among the plurality of propagation paths, signals cannot be separated, leading to degradation of characteristics.

Thus, for example, according to a technology described in Japanese Patent Application Laid-Open No. 2003-204317, conditions of the propagation paths are acquired and depending on the acquired conditions, different signals are transmitted, different frequencies are used, or the same signals are transmitted from a plurality of antennas.

FIG. 14 is a diagram showing an outline configuration of a conventional radio transmission device. The radio transmission device transmits radio signals, for example, by the OFDM method. Since the OFDM method can reduce an influence of multi-path delay spread in high-speed digital signal transmission by using multiple carriers and inserting guard intervals, the method has attracted attention as a promising next-generation mobile broadband radio access system. Here, an OFDM signal is obtained by multiplexing signals of a plurality of orthogonal sub-carriers and will be described below by taking a case of two antennas as an example.

As shown in FIG. 14, a radio transmission device 100 has a system 1 transmitting a transmission signal A and a system 2 transmitting a transmission signal B. The system 1 includes an encoding part 101, a sub-carrier modulation part 102, an inverse fast Fourier transform (IFFT) part 103, a slot assembly part 104, a frequency conversion part 105, and an antenna 106. The system 2 includes an encoding part 111, a sub-carrier modulation part 112, an inverse fast Fourier transform (IFFT) part 113, a slot assembly part 114, a frequency conversion part 115, and an antenna 116. Further, the transmitter 100 includes a carrier frequency control part 121, a transmission signal switching part 122, and an overall control part 123.

Next, adaptive control for the conventional radio transmission device having such a configuration will be described.

Here, a case in which four channels (frequency bands) from channel 1 (CH1) to channel 4 (CH4) can be used as available frequencies is taken as an example for the description below. In FIGS. 15 to 17, an antenna #1 is the antenna 106 of the system 1 and an antenna #2 is the antenna 116 of the system 2.

The radio transmission device 100 can take three radio communication modes. The first one is spatial multiplexing, that is, as shown in FIG. 15, different information (transmission signal A≠transmission signal B) is transmitted from the two antennas 106 and 116 using the same frequency. The second one is frequency multiplexing, that is, as shown in FIG. 16, different information (transmission signal A≠transmission signal B) is transmitted from the two antennas 106 and 116 using different frequencies. The third one is spatial diversity, that is, as shown in FIG. 17, the same information (transmission signal A=transmission signal B) is transmitted from the two antennas 106 and 116 using the same frequency.

More specifically, if, for example, an error detection result is good, that is, propagation path conditions are good, spatial multiplexing is performed by transmitting different information (transmission signal A≠transmission signal B) from the two antennas 106 and 116 using the same frequency, as shown in FIG. 15. In the example shown in FIG. 15, the same idle channel (CH3) is used for multiplexing different transmission signals A and B to transmit from the antenna 106 of the system 1 and the antenna 116 of the system 2 respectively while avoiding frequencies (channels) of CH1, CH2, and CH4 where interference waves exist, that is, that are already allocated to other users. At this point, a reception operation using the frequency (the frequency of CH 3 in the example of FIG. 15) used by the transmitter 100 is performed on a receiver side.

If, for example, the error detection result is not good, that is, propagation path conditions are not good, frequency multiplexing is performed by transmitting different information (transmission signal A≠transmission signal B) from the two antennas 106 and 116 using different frequencies, as shown in FIG. 16. In the example shown in FIG. 16, out of two channels CH2 and CH3 that are idle, one channel (CH2) is used for transmission of the transmission signal A from the antenna 106 of the system 1 and the other channel (CH3), which is different from that of the system 1, is used for transmission of the transmission signal B, which is different from that of the system 1, from the antenna 116 of the system 2 while avoiding frequencies (channels) of CH1 and CH4 where interference waves exist, that is, that are already allocated to other users. At this point, a reception operation using the frequencies (the frequency of CH 2 for the system 1 and that of CH 3 for the system 2 in the example of FIG. 16) of the systems used by the transmitter 100 is performed on the receiver side.

If, for example, the error detection result is extremely bad, that is, propagation path conditions are so bad that different information cannot be transmitted from a plurality of antennas, spatial diversity is performed by selectively transmitting the same information (transmission signal A=transmission signal B) from the two antennas 106 and 116 using the same frequency, as shown in FIG. 17. In the example shown in FIG. 17, the same idle channel (CH3) is used to perform spatial diversity transmission of the same transmission signal (transmission signal A=transmission signal B) from the antenna 106 of the system 1 and the antenna 116 of the system 2 while avoiding frequencies (channels) of CH1, CH2, and CH4 where interference waves exist, that is, that are already allocated to other users. At this point, a reception operation using the frequency (the frequency of CH 3 in the example of FIG. 17) used by the transmitter 100 is performed on the receiver side.

Data transmitted from the transmitter described above is arranged, for example, as shown in FIG. 18 or 19. Here, the case of 30 sub-carriers is shown and, if the same signal is transmitted from the antenna 1 and the antenna 2, as shown in FIG. 18, the data is allocated to data sub-carriers in ascending order of frequency respectively. If, on the other hand, different data is transmitted from each antenna in spatial multiplexing, as shown in FIG. 19, the first to the 30th data are allocated to the antenna 1 and the 31st to the 60th data are allocated to the antenna 2. Patent Document 1: Japanese Patent Application Laid-Open No. 2003-204317

DISCLOSURE OF THE INVENTION

In the conventional technology described above, either transmission of different signals or transmission of the same signal, from two antennas, is selected depending on propagation path conditions. However, since separate systems of transmitter are provided for OFDM signals for selection of two alternatives in such a conventional technology, as shown in FIGS. 18 and 20, all sub-carriers of OFDM will transmit entirely different signals or separate signals. As a result, the conventional technology has the drawback that if the modulation method and encoding rate are the same, an amount of transmittable information will be either one or two as a relative value and the amount of transmittable information is halved quickly if the propagation path conditions become worse.

The present invention has been made in view of circumstances described above and an object thereof is to provide a radio transmission device that can provide maximum throughput in accordance with characteristics of a propagation path.

(1) To achieve the above object, the present invention has means shown below. That is, a radio transmission device according to the present invention has a plurality of transmitting antennas for transmitting a transmission signal in units of sub-carriers by performing spatial multiplexing or without performing spatial multiplexing, and the transmitter includes: a sub-carrier modulation part modulating the input transmission signal for each sub-carrier; a transmission signal allocation part allocating the transmission signal modulated for each of the sub-carriers to each of the transmitting antennas; and a transmission control part that determines a multiplexing number for performing spatial multiplexing for each sub-carrier based on information received from another radio communication device as an opposite party, and outputs the determined multiplexing number to the sub-carrier modulation part and the transmission signal allocation part.

Since the transmission signal is allocated to each transmitting antenna after being modulated by the sub-carrier modulation part as described above, whether to transmit the same signal or a separate signal from each transmitting antenna can be selected for each sub-carrier. This makes it possible, in accordance with propagation path characteristics, to perform spatial multiplexing for sub-carriers whose propagation path is good, while transmitting transmission signals without performing spatial multiplexing for sub-carriers whose propagation path is not good. As a result, maximum throughput can be obtained in accordance with the propagation path characteristics.

(2) Further, the radio transmission device according to the present invention is characterized in that the transmission signal is composed of a plurality of ordered symbols, and the transmission signal allocation part allocates, based on the multiplexing number input from the transmission control part, the symbols of the transmission signal for sub-carriers having multiplexing number of two or more so that symbols different from one another are transmitted by the transmitting antennas in the number corresponding to the determined multiplexing number.

Since the symbols of the transmission signal are allocated so that symbols different from one another are transmitted by the transmitting antennas in the number corresponding to the determined multiplexing number for sub-carriers having multiplexing number of two or more, the transmission signal can be multiplexed in accordance with the multiplexing number thereof to be transmitted by sub-carriers having multiplexing number determined by the transmission control part. This makes it possible, in accordance with propagation path characteristics, to perform spatial multiplexing for sub-carriers whose propagation path is good, while transmitting transmission signals without performing spatial multiplexing for sub-carriers whose propagation path is not good.

(3) Further, the radio transmission device according to the present invention is characterized in that the transmission signal allocation part allocates, for sub-carriers having an identical multiplexing number, the symbols to each of the sub-carriers so that frequencies are continuous in descending or ascending order of frequency in each of the transmitting antennas.

Since the symbols are allocated to each sub-carrier having an identical multiplexing number so that frequencies are continuous in descending or ascending order of frequency in each of the transmitting antennas as described above, a procedure for allocating the symbols can be simplified.

(4) Further, the radio transmission device according to the present invention is characterized in that the transmission signal allocation part allocates, for sub-carriers having multiplexing number of two or more, the symbols to each of the sub-carriers so that the symbols are continuous among the transmitting antennas.

Since the symbols are allocated to each sub-carrier having multiplexing number of two or more so that the symbols are continuous among the transmitting antennas, it becomes possible to avoid concentration of data having a higher error rate. That is, if transmission signals are allocated to sub-carriers continuously in each transmission antenna, it is expected that a transmission signal ranked afterward in the order will be more frequently multiplexed, resulting in a higher error rate for transmission signals ranked afterward in the order. Since symbols are allocated for sub-carriers having multiplexing number of two or more so that the symbols are continuous among transmitting antennas, a higher error rate of a transmission signal ranked afterward in the order can be prevented.

(5) Further, the radio transmission device according to the present invention is characterized in that the transmission control part determines a percentage of numbers of the symbols allocated to each of the determined multiplexing numbers and the transmission signal allocation part allocates the symbols to each sub-carrier in descending or ascending order of frequency in accordance with the percentage and the order of the symbols.

As the multiplexing number increases, the error rate will generally be higher accordingly. However, according to the present invention, the symbols of a transmission signal are sequentially allocated in accordance with the multiplexing number and thus signals having a higher error rate are dispersed to enable improvement of overall characteristics.

(6) Further, the radio transmission device according to the present invention is characterized in that the symbol is formed by delimiting the transmission signal for each of a specific amount of data.

Since the symbol is formed by delimiting a transmission signal for each of a specific amount of data as described above, the amount of transmission information can be adjusted. For example, the amount of transmission information can be adjusted by selecting the symbol as a delimiter in a minimum unit of transmission signal.

(7) Further, the radio transmission device according to the present invention is characterized in that the transmission control part determines the multiplexing number for each spread unit when the transmission signal is spread on a frequency or time axis.

Thus, if the transmission signal is spread on the frequency or time axis, despreading processing is performed on a receiving side within one symbol data. Therefore, it is preferable that characteristics (for example, received power and noise characteristics) be identical within a spread signal. Since the multiplexing number is determined for each of three units according to the present invention, despreading processing after reception can be performed appropriately while improving overall throughput.

(8) Further, the radio transmission device according to the present invention is characterized in that the transmission control part determines the multiplexing number in block units when sub-carriers are blocked in basic units and signal processing of the transmission signal is performed in the block units.

Since the multiplexing number is determined in the block units when signal processing of a transmission signal is performed in the block units as described above, decoding processing can be performed appropriately in the block units on the receiving side while improving overall throughput.

(9) Further, the radio transmission device according to the present invention is characterized in that, if any two or more of the transmitting antennas transmit an identical transmission signal, the transmission control part reduces transmission power of each transmitting antenna that transmits the identical transmission signal.

Since, when any two or more of the transmitting antennas transmit an identical transmission signal, transmission power of each transmitting antenna that transmits the identical transmission signal is reduced, an increase in power when the identical transmission signal is transmitted can be prevented so that appropriate transmission power is used for transmission. Incidentally, adoption of a technique equivalent to reduction in transmission power, for example, a technique for adjusting amplitudes may also be effective. Further, for sub-carriers transmitting identical signals, power of a signal transmitted by one of transmitting antennas is reduced to ½, ⅓, and so on or power of any other transmitting antenna may be set to zero.

(10) A radio receiver according to the present invention having a plurality of receiving antennas for receiving a signal transmitted by any of the radio transmission devices described above is characterized in that, if any two or more of the receiving antennas receive an identical signal, synthesis processing of the received signal is performed.

Since whether multiplexed or not is known on the receiver side in advance for each sub-carrier, processing of synthesis and demodulation is performed after reception only for sub-carriers to which identical signals are allocated. Diversity by which signals to be received are received by multiple RF circuits or the like for synthesis is well-known as a known technology and, in the present invention, characteristics can be improved by performing MIMO processing of multiplexed signals and diversity processing of non-multiplexed signals. Since conventional diversity reception requires multiple receiving systems and an improvement factor is not evident considering a relatively heavy burden on the circuit (for example, about 2 dB in a 2-system reception system and about 3 dB in a 3-system reception system), such conventional diversity reception has been in practical use only in part of applications. In the present invention, however, since multiple receiving RF signal systems are originally provided for MIMO processing, characteristics can advantageously be improved with no increase in burden on the circuit.

(11) A radio communication system according to the present invention is characterized in that the radio communication system comprises any of the radio transmission devices described above and the radio receiver described above.

According to the present invention, spatial multiplexing can be used for sub-carriers whose propagation path is good, while transmitting transmission signals without performing spatial multiplexing for sub-carriers whose propagation path is not good. As a result, maximum throughput can be obtained in accordance with the transmission path characteristics.

(12) A radio transmission method according to the present invention uses a plurality of transmitting antennas for transmitting a transmission signal by performing spatial multiplexing of the transmission signal in units of sub-carriers or without performing spatial multiplexing and includes at least the steps of: determining a multiplexing number for performing spatial multiplexing for each sub-carrier based on information received from another radio communication device as an opposite party; modulating the input transmission signal for each sub-carrier in accordance with the determined multiplexing number; and allocating the transmission signal modulated for each of the sub-carriers to each of the transmitting antennas based on the determined multiplexing number.

Since the transmission signal is allocated to each transmitting antenna after being modulated for each sub-carrier as described above, whether to transmit the same signal or a separate signal from each transmitting antenna can be selected for each sub-carrier. This makes it possible, in accordance with propagation path characteristics, to perform spatial multiplexing for sub-carriers whose propagation path is good, while transmitting transmission signals without performing spatial multiplexing for sub-carriers whose propagation path is not good. As a result, maximum throughput can be obtained in accordance with the propagation path characteristics.

(13) Further, the radio transmission method according to the present invention further includes the step of determining the multiplexing number in spread units when the transmission signal is spread on a frequency or time axis.

Thus, if the transmission signal is spread on the frequency or time axis, despreading processing is performed on the receiving side within one symbol data. Therefore, it is preferable that characteristics (for example, received power and noise characteristics) be identical within a spread signal. Since the multiplexing number is determined for each of three units according to the present invention, despreading processing after reception can be performed appropriately while improving overall throughput.

(14) Further, the radio transmission method according to the present invention further includes the step of determining the multiplexing number in block units when sub-carriers are blocked in basic units and signal processing of the transmission signal is performed in the block units.

Since the multiplexing number is determined in the block units when signal processing of a transmission signal is performed in the block units as described above, decoding processing can be performed appropriately in the block units on the receiving side while improving overall throughput.

According to the present invention, maximum throughput in accordance with propagation path characteristics can be obtained because the multiplexing number can be selected for each sub-carrier. Also, degradation of characteristics can be reduced because allocation of transmission signals (data) can be prevented from concentrating on sub-carriers with a high error rate. Further, the number of sub-carriers multiplexed consistently adjusting to the number of signals (data) to be transmitted and system specifications can be controlled. Moreover, reception diversity for each sub-carrier that is not multiplexed can be realized with almost no increase in circuit size.

BRIEF DESCRIPTION OF THE DRAWINGS

FIG. 20 is a diagram showing relationships between each transmitting antenna and sub-carriers when transmitting different signals and the same signal in the conventional transmitter.

BEST MODES FOR CARRYING OUT THE INVENTION

First Embodiment

Figure 1:
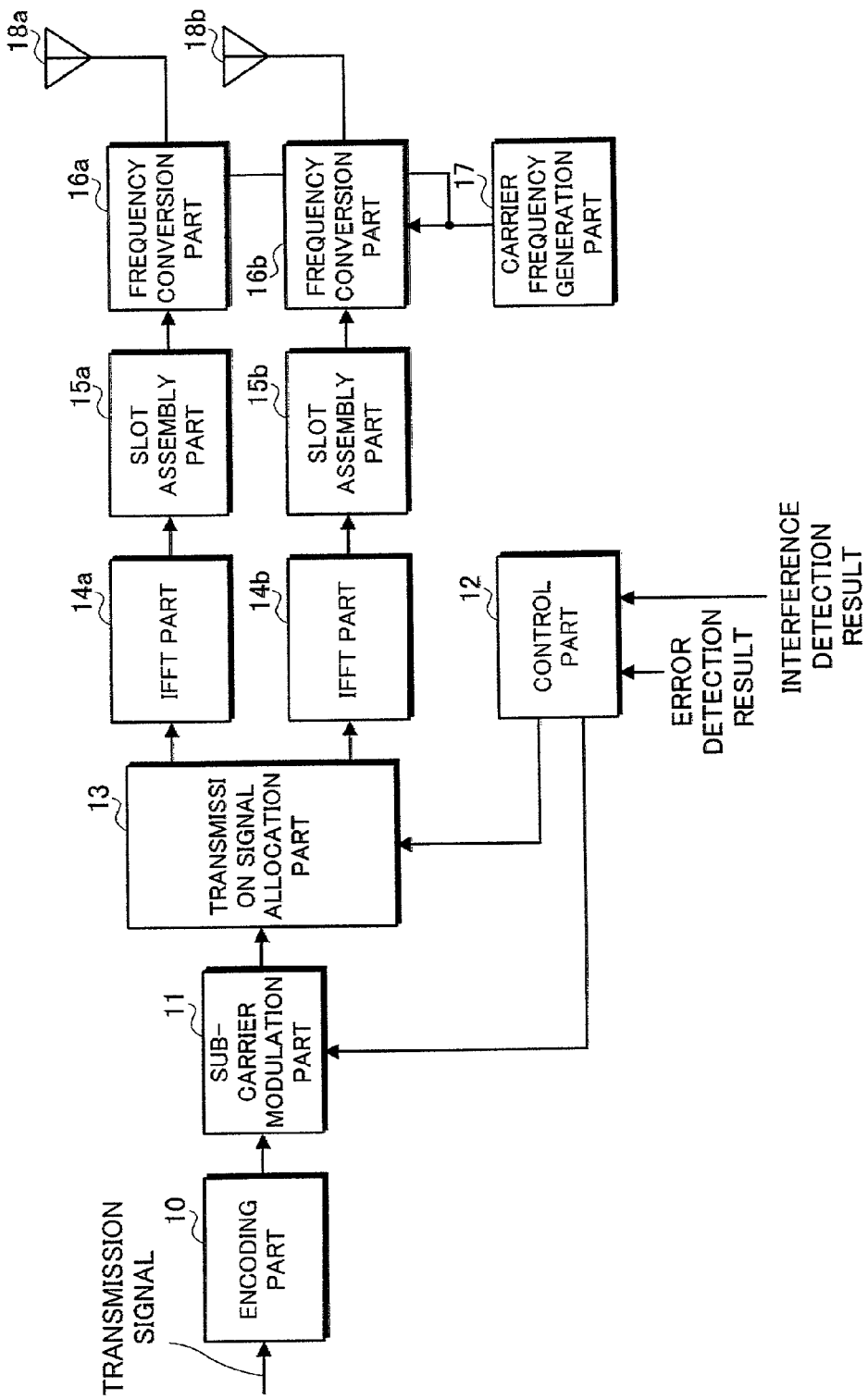
FIG. 1 is a block diagram showing an outline configuration of a radio transmission device according to a first embodiment.

FIG. 1 is a block diagram showing an outline configuration of a radio transmission device according to a first embodiment. Encoding processing of a transmission signal is performed by an encoding part 10. Next, modulation of the transmission signal is performed for each sub-carrier by a sub-carrier modulation part 11. A control part 12 determines, based on information received from another radio communication device as an opposite party, the multiplexing number for performing spatial multiplexing for each sub-carrier using, for example, an error detection result and an interference detection result and outputs the determined multiplexing number to the sub-carrier modulation part 11 and a transmission signal allocation part 13. The transmission signal allocation part 13 transfers signals in the number corresponding to the number of sub-carriers to be processed by two IFFT parts 14a and 14b to the IFFT parts 14a and 14b. For example, if a system has 768 sub-carriers, 768 signals are transferred respectively. In slot assembly parts 15a and 15b, a guard time, a preamble part and the like are added to the signals that have been converted to time waveforms by the IFFT parts 14a and 14b to create a slot configuration to be transmitted. Next, the transmission signal is converted to RF frequencies by frequency conversion parts 16a and 16b based on frequencies generated by a carrier frequency generation part 17 to be transmitted from antennas 18a and 18b.

Next, determination criteria whether to perform spatial multiplexing for each sub-carrier can be based on any information shown below:

(1) Antenna correlation of received signals for each sub-carrier. This is because interference increases when multiplexed in a high antenna correlation.

(2) Received power. This is because it is better to decrease multiplicity when the received power is low.

(3) Intensity of interference power for each sub-carrier. This is because propagation path estimation errors used for signal separation of MIMO increase when there are many interference waves.

(4) It should be considered when a fixed number of sub-carriers are allocated to each user. This is because it is necessary to preferentially increase the multiplicity of a user if the information amount of the user must be increased at a certain time.

Figure 2:
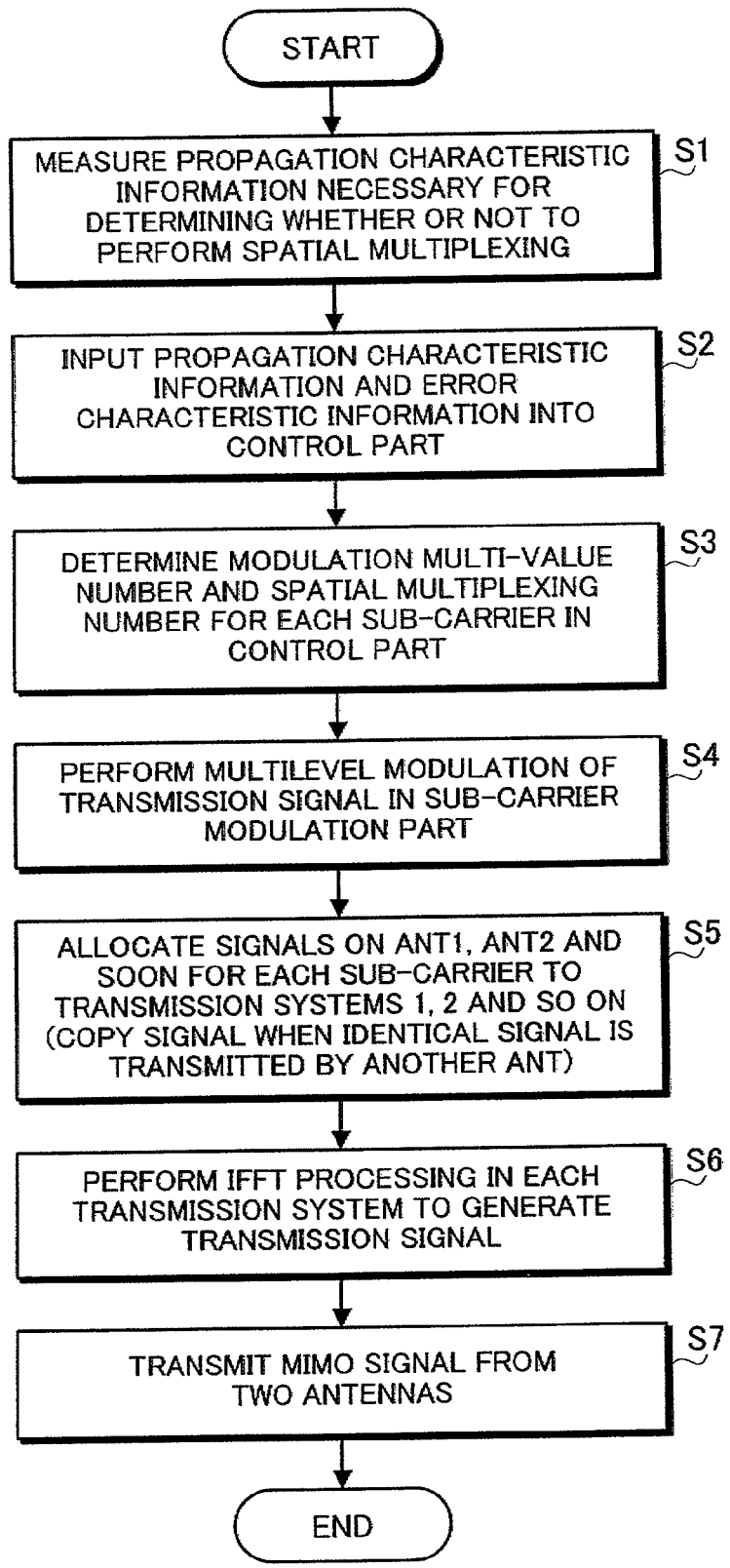
FIG. 2 is a flow chart showing an operation of the radio transmission device according to the first embodiment.
Figure 3:
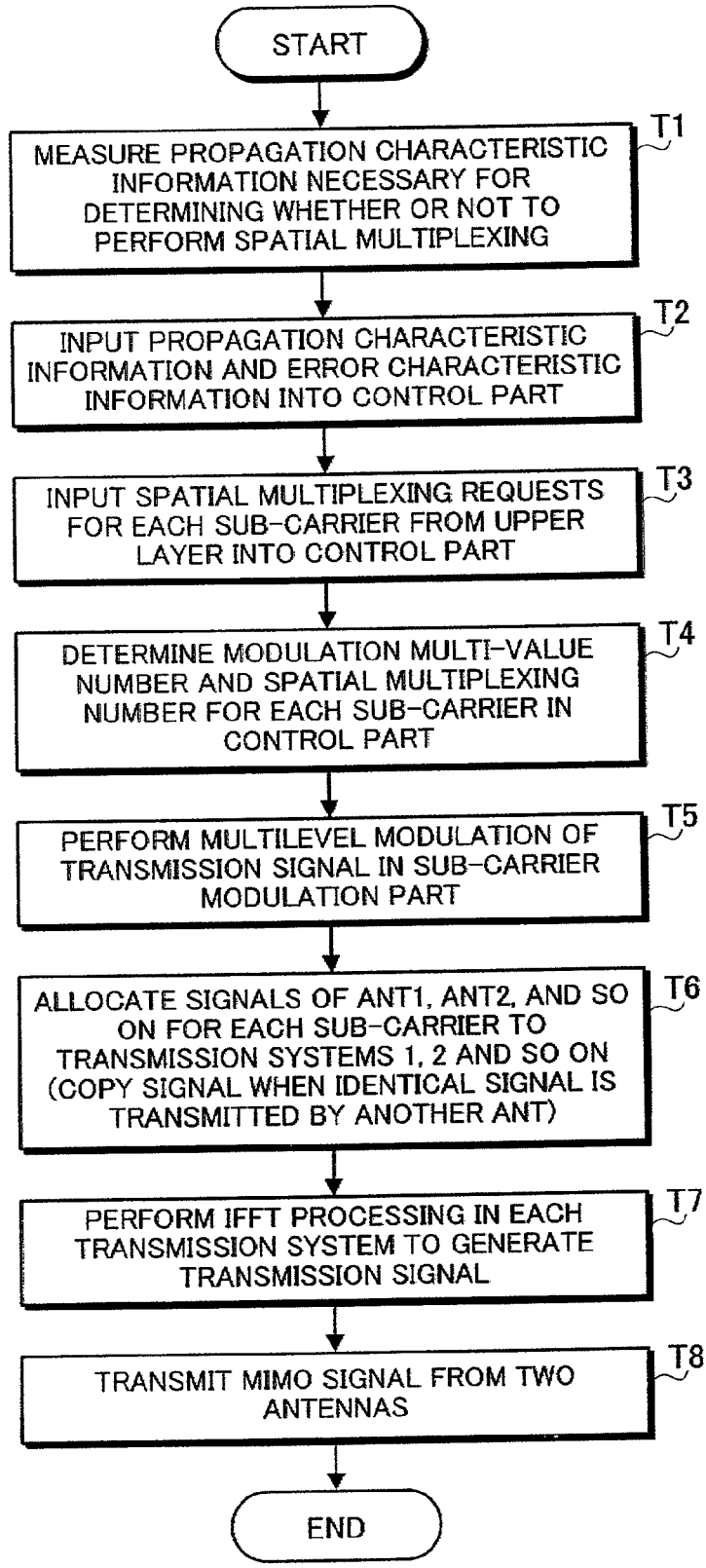
FIG. 3 is a flow chart showing an operation of the radio transmission device according to the first embodiment.

An operation determining a spatial multiplexing number in units of sub-carriers based on any of the above determination criteria will be performed based on a flow chart shown in FIGS. 2 and 3. First, as shown in FIG. 2, propagation characteristic information necessary for determining whether or not to perform spatial multiplexing is measured (step S1). Next, when the propagation characteristic information, error characteristic information and the like are input into the control part 12 (step S2), the control part 12 determines a modulation multi-value number and the spatial multiplexing number (step S3). Then, the sub-carrier modulation part 11 performs multilevel modulation of a transmission signal (step S4). Then, signals of an antenna 1, an antenna 2, and so on for each sub-carrier are allocated to the transmission systems 1, 2, and so on (step S5). Here, if an identical signal is transmitted using another antenna, the signal is copied. Then, IFFT processing is performed by each transmission system to generate a transmission signal (step S6). Lastly, a MIMO signal is transmitted from two transmitting antennas (step S7) before completion.

Also, a method shown in FIG. 3 may be adopted. That is, propagation characteristic information necessary for determining whether or not to perform spatial multiplexing is measured (step T1), and the propagation characteristic information, error characteristic information and the like are input into the control part 12 (step T2). Next, spatial multiplexing requests for each sub-carrier from an upper layer are input into the control part 12 (step T3). Then, the control part 12 determines the modulation multi-value number and spatial multiplexing number (step T4). Then, the sub-carrier modulation part 11 performs multilevel modulation of a transmission signal (step T5). Then, signals of the antenna 1, antenna 2, and so on for each sub-carrier are allocated to the transmission systems 1, 2, and so on (step T6). Here, if an identical signal is transmitted using another antenna, the signal is copied. Then, IFFT processing is performed by each transmission system to generate a transmission signal (step T7). Lastly, a MIMO signal is transmitted from two transmitting antennas (step T8) before completion.

As described above, the spatial multiplexing number for each sub-carrier is determined by the control part 12 based on information necessary for the above determination criteria. Incidentally, the information includes information that must be exchanged between the transmitting side and receiving side and information that can be judged by one communication device. In the description above, the multiplexing number for each sub-carrier is determined by the control part on the transmitting side based on a variety of information, but it is also possible to have the receiving side transmit a multiplexing number to notify the control part 12 of the determined multiplexing number. Carriers to be multiplexed and possible multiplexing numbers can thereby be determined.

Figure 4:
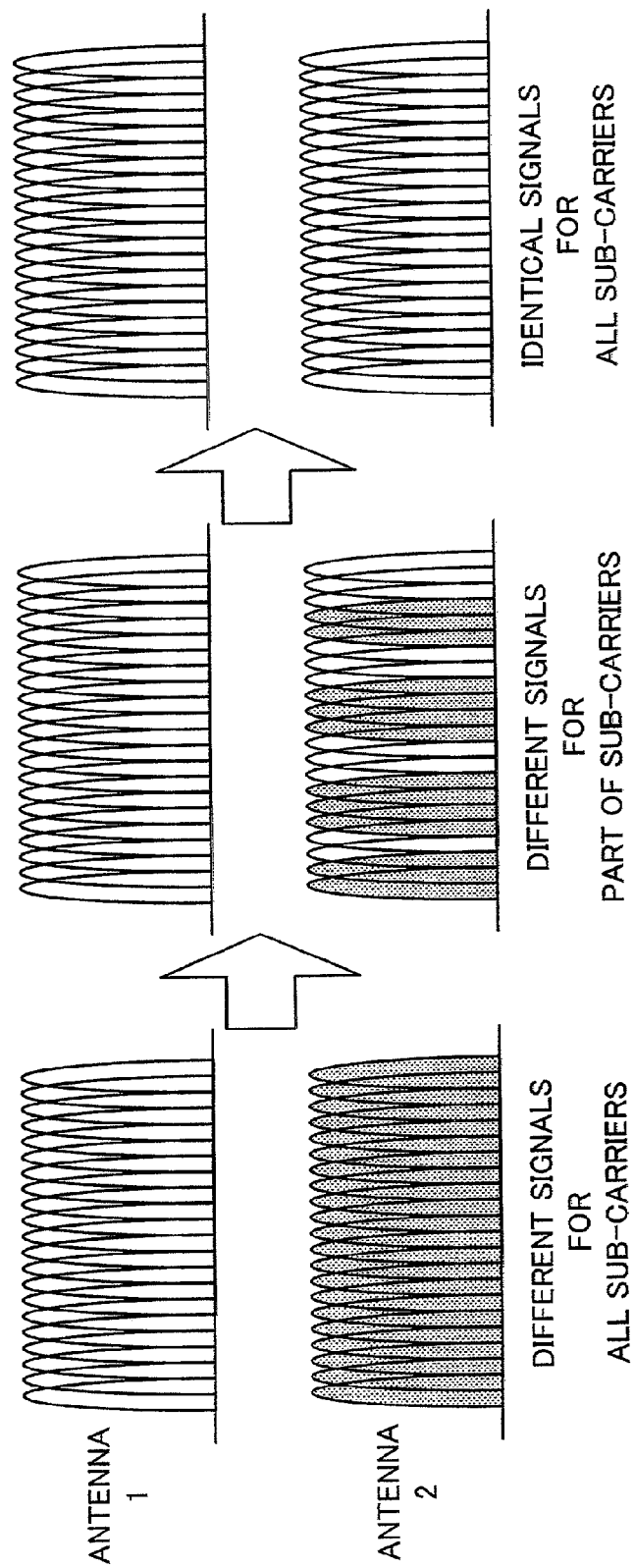
FIG. 4 is a diagram showing a state of multiplexing for each sub-carrier in the first embodiment.

FIG. 4 is a diagram showing signals processed for each sub-carrier by the radio transmission device according to the first embodiment. Since, in the first embodiment, encoding and sub-carrier modulation are made common and then signals are allocated by the transmission signal allocation part 13, as shown in FIG. 4, a selection can be made whether to transmit the same signal or separate signals in sub-carrier units. Conventionally, only a selection of two alternatives whether all sub-carriers transmit identical signals or different signals has been possible, but in the first embodiment, a selection can be made in between thereof, in which some sub-carriers transmit identical signals and the other sub-carriers transmit different signals.

As a result, overall throughput can be improved by transmitting, in accordance with the propagation path conditions, identical signals by sub-carriers whose propagation path is not good and performing spatial multiplexing for sub-carriers that are expected to cause almost no problems if signals are transmitted by multiplexing.

Here, in order to allocate the signals, it is necessary to receive the number of signals to be multiplexed (multiplexing number) from the control part 12 and to notify the sub-carrier modulation part 11 and the transmission signal allocation part 13 of the number. If, for example, there are 768 sub-carriers in all and 300 sub-carriers transmit identical signals, symbols for which modulation processing is performed by the sub-carrier part are those for (768+768−300) signals. Then, identical modulation information will be used for sub-carriers that transmit identical signals when outputting to the IFFT parts 14a and 14b.

Here, the multiplexing number "two" has been assumed for the description above, but the multiplexing number is not limited to "two" and if there are three transmission systems and the multiplexing number is three, the multiplexing number can be selected for each sub-carrier out of the multiplexing numbers one, two, and three.

Next, how to allocate data will be described in each case. Since data errors occur unavoidably in radio communication, a means for correcting errors using an error correcting technique when errors occur is used. That is why the transmission signal is encoded by the encoding part 10 in FIG. 1.

Focusing on positions of error occurrence, however, if several dozens bits of errors are concentrated on one position and several bits of errors are scattered under the condition of the same error rate, scattered errors turn out to be easier to correct. Therefore, when allocating transmission data, avoiding concentration of data having a high error rate and that having a low error rate will also contribute to improvement of an overall error rate. Another condition is that the error rate will be generally worse when sub-carriers are multiplexed than when they are not because an influence of interference may remain in the multiplexed sub-carriers.

Figure 5:
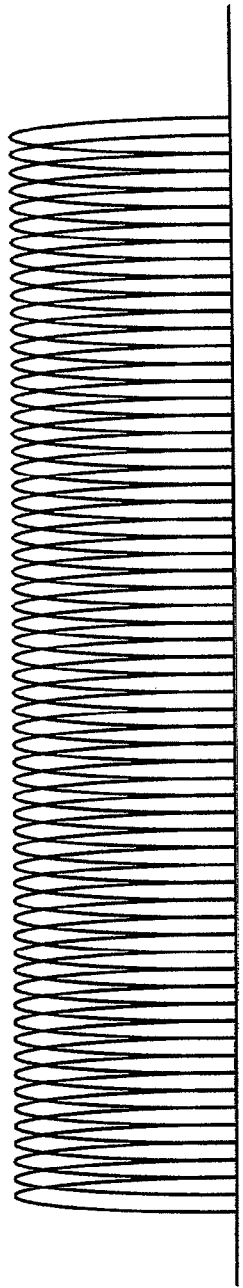
FIG. 5 is a diagram showing a state in which a transmission signal is allocated to each sub-carrier in the first embodiment.

Based on concepts described above, three allocation methods below can be considered. A first allocation method is one in which signals are filled sequentially from one end of the sub-carrier numbers in a first transmission system and a second transmission system, and the same signals as those transmitted by the first antenna are transmitted by the sub-carriers not multiplexed and different data is transmitted by the sub-carriers multiplexed. This is shown in FIG. 5. In the example shown in FIG. 5, the antenna 1 transmits signals 1 to 30, and the antenna 2 and an antenna 3 transmit signals 31 to 46 by the sub-carriers multiplexed. The antennas 2 and 3 transmit the same signals as those transmitted by the antenna 1 by the sub-carriers not multiplexed.

Figure 6:
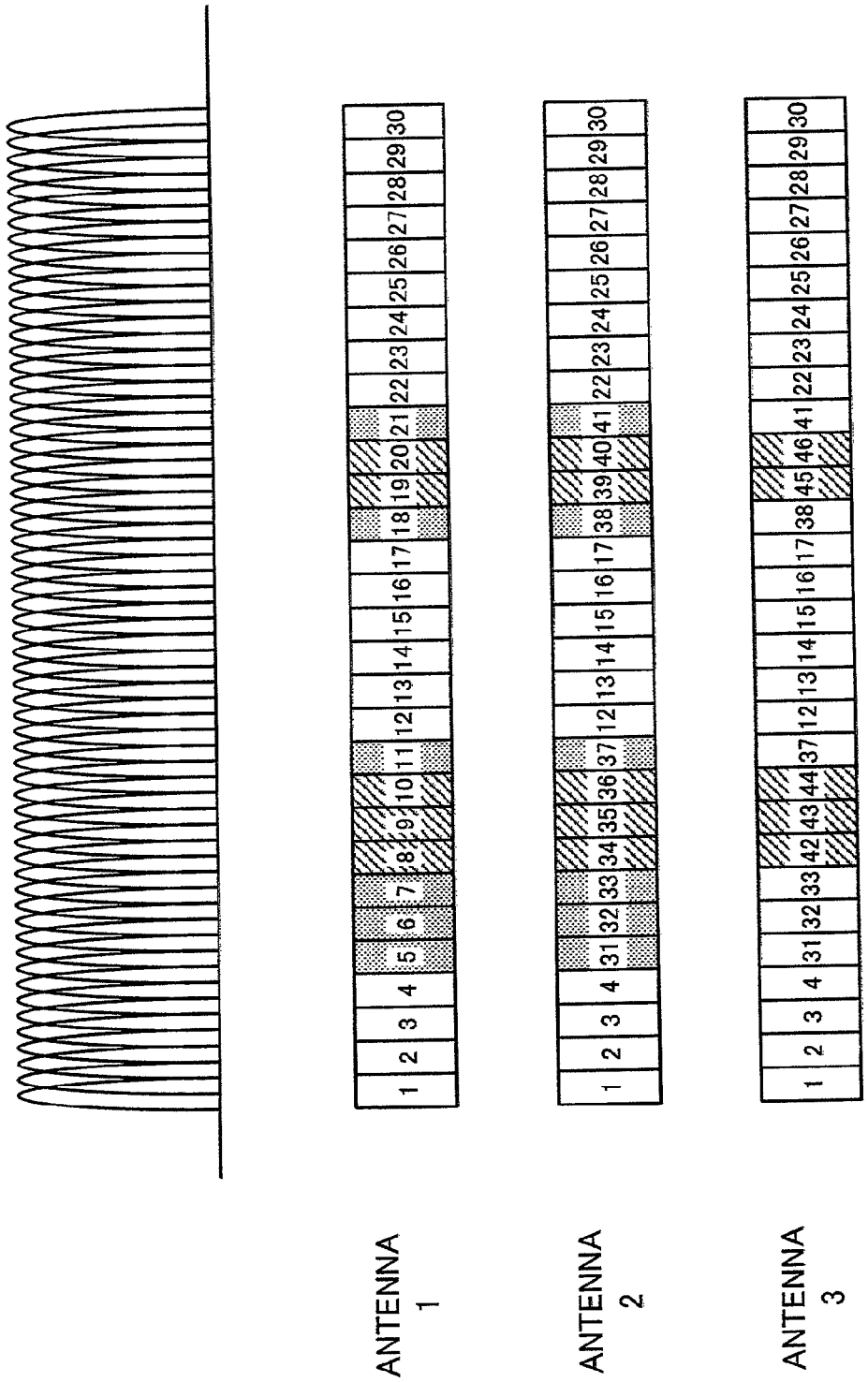
FIG. 6 is a diagram showing a state in which the transmission signal is allocated to each sub-carrier in the first embodiment.

In the example shown in FIG. 6, the antenna 1 transmits signals 1 to 30, and the antennas 2 and 3 transmit signals 31 to 46 by the sub-carriers multiplexed. The antenna 2 transmits the same signals as those transmitted by the antenna 1 by the sub-carriers not multiplexed, but the antenna 3 transmits the same signals as those transmitted by the antenna 2 by the sub-carriers not multiplexed.

When there are a plurality of antennas, a transmission signal will be the same as that transmitted by one of the antennas, as described above. However, by combining FIGS. 5 and 6, signals transmitted by the antennas 1 and 2 can also be mixed in those of the antenna 3.

Figure 7:
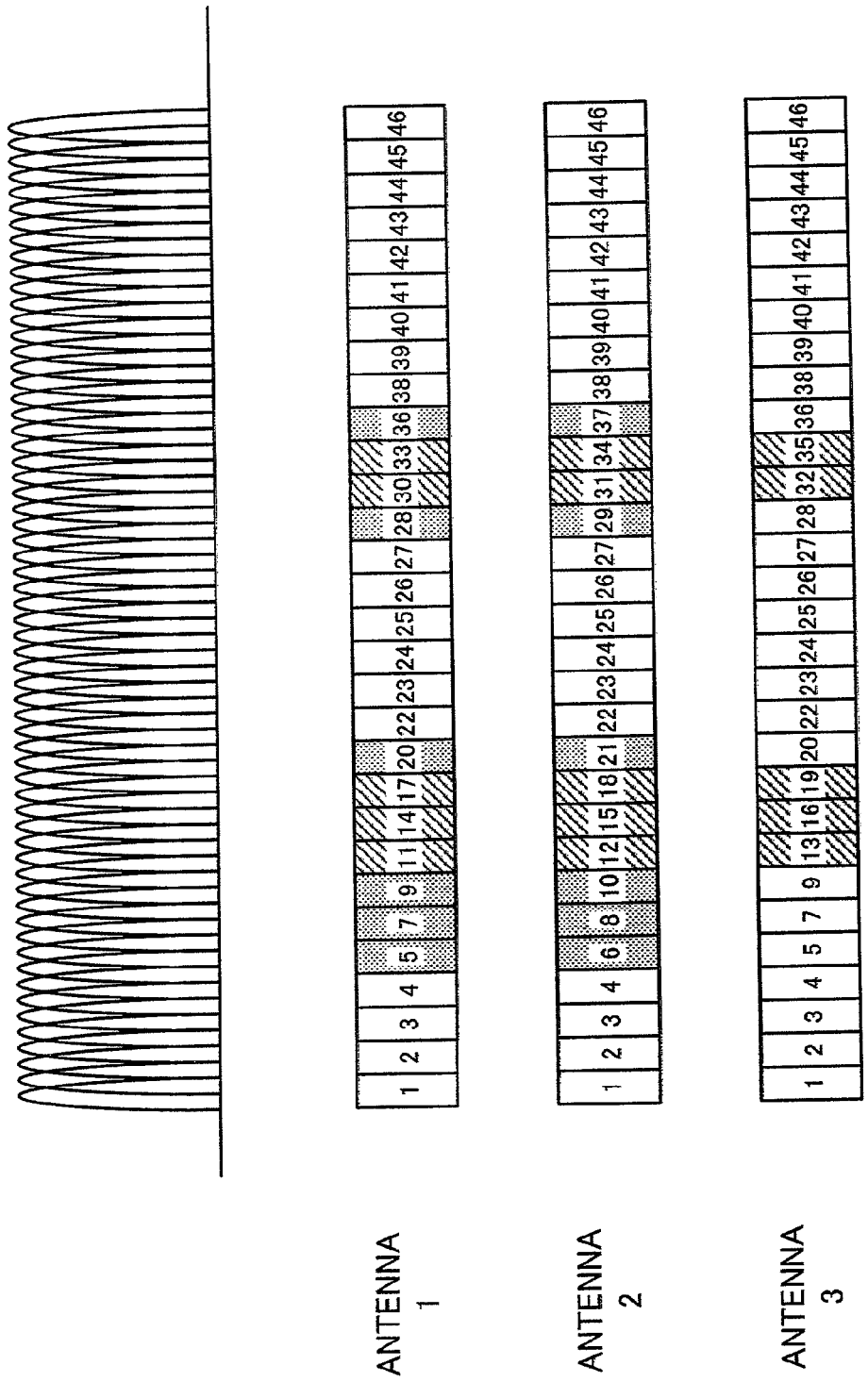
FIG. 7 is a diagram showing a state in which the transmission signal is allocated to each sub-carrier in the first embodiment.

Next, a second allocation method is one in which signals are sequentially filled, instead of transmitting signals 1 to 30 by the antenna 1. This method is shown in FIG. 7. As shown in FIG. 7, first to fifth signals are sequentially allocated to each antenna from the head and for a sub-carrier whose multiplicity is 2, the fifth signal is allocated to the antenna 1 and a sixth signal is allocated to the antenna 2.

According to the first allocation method, there is a concern that if signals to be used for multiplexing are together allocated after signals are first allocated to one transmission system as a multiplexing method, signals to be multiplexed will be concentrated toward a second half and data having a high error rate will be concentrated in the second half, but according to the second allocation method, the problem of concentration in the second half can be solved.

Figure 8:
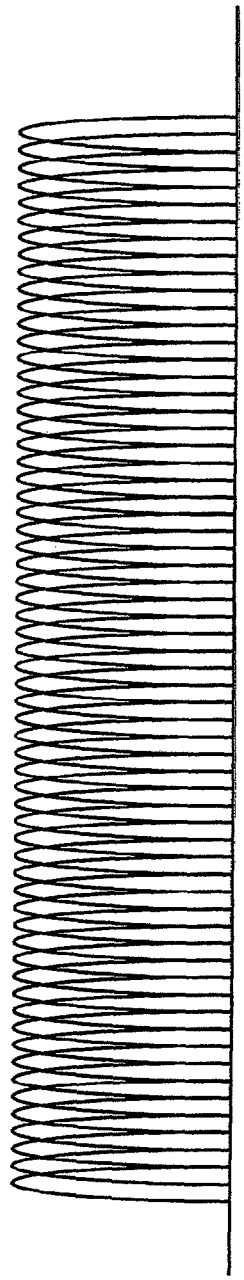
FIG. 8 is a diagram showing a state in which the transmission signal is allocated to each sub-carrier in the first embodiment.

Next, a third allocation method is one in which signals are sequentially allocated in accordance with the multiplexing number. As the multiplexing number increases to three or four, the error rate will also be higher accordingly. Thus, as an allocation method of data, sub-carriers are allocated in accordance with a ratio like: a singly multiplexed (non-multiplexed) sub-carrier, a doubly multiplexed sub-carrier, a triply multiplexed sub-carrier, a quadruply multiplexed sub-carrier, a singly multiplexed sub-carrier, a doubly multiplexed sub-carrier, a triply multiplexed sub-carrier. This example is shown in FIG. 8. In the example shown in FIG. 8, numbers of pieces of singly, doubly, and triply multiplexed data are allocated in the ratio of 3:4:3 and thus patterns like: first, second, and third signals are "singly multiplexed" fourth, fifth, and sixth signals are "doubly multiplexed" seventh, eighth, and ninth signals are "triply multiplexed" eleventh, twelfth, and thirteenth signals are "singly multiplexed", . . . will be repeated.

In this case, since there is no concern that signals having large multiplexing numbers continue and data having high error rates is scattered, overall characteristics can be improved.

Though the numbers of sub-carriers specified by each multiplexing number are not actually realized in the same ratio, the numbers of sub-carriers intended for each multiplexing number are determined by the control part and periods for allocation may be changed in accordance with the ratio thereof.

In some communication systems, errors are scattered by performing interleave processing. Also in this case, similar effects can be obtained by avoiding concentration of data having a large multiplexing number in the alignment order after interleave/deinterleave processing.

Second Embodiment

Next, allocation methods in accordance with the number of signals (number of pieces of data) will be described. First, there is a method of allocation focusing on the number of pieces of data. The allocation methods focusing on the number of pieces of data includes two methods.

(1) First Method

The amount of transmission information is adjusted by fitting to a minimum delimiter of data to be transmitted.

More specifically, if data is allocated in accordance with the multiplexing number to each sub-carrier, as with the first embodiment described above, the amount of data that can be transmitted/received will be x bits, but if data is delimited by a data unit, select a greatest k satisfying (data unit)*k<x.

Though the data unit is not specified, normally units of byte (8 bits), units of word (16 bits), or units of 100-bit can be considered as a standard.

In this case, discarded bits can be used as a margin to decrease the multiplexing number of multiplexed sub-carriers.

(2) Second Method

The multiplexing number is allocated based on the minimum unit.

Figure 9:
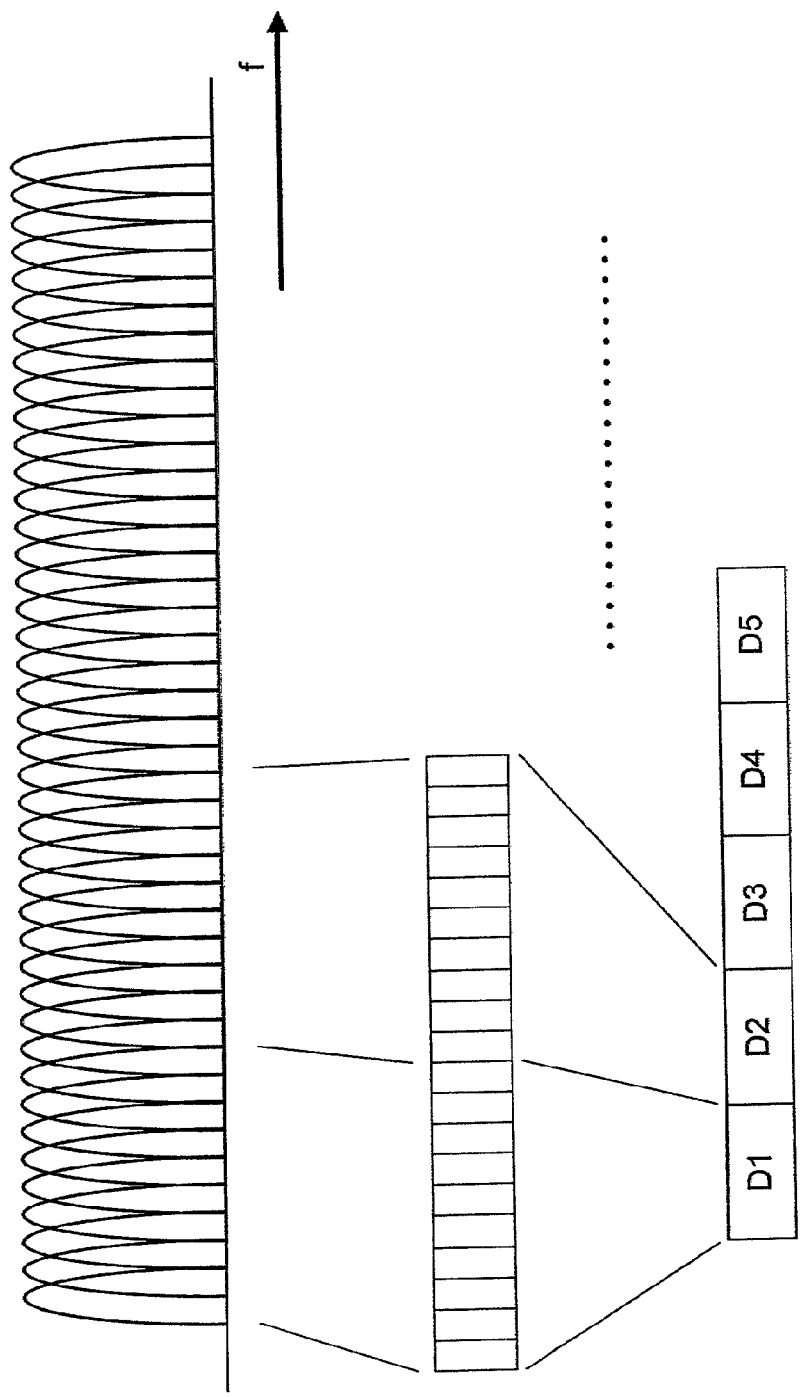
FIG. 9 is a diagram showing a state in which a spread signal is allocated to each sub-carrier in a second embodiment.

Here, an example of a system called MC-CDMA (Multi carrier OFDM) combining spread spectrum being used more frequently in recent years in communication systems using OFDM will be shown. An outline of this system is shown in FIG. 9. Data symbols are spread in the MC-CDMA (spread tenfold in FIG. 9) and then the spread signals are allocated to each sub-carrier for transmission. If the second embodiment is adapted in such a communication system, the same spatial multiplexing number applies between spread symbols of data.

In the MC-CDMA, despreading processing is performed within one symbol data after reception and, in that case, it is preferable that characteristics (for example, received power and noise characteristics) be identical between spread signals. Thus, signals are distributed for multiplexing using the standard unit spread on the frequency axis of the MC-CDMA as the minimum unit.

If the transmission signal is spread on the frequency or time axis, as described above, despreading processing is performed on the receiving side within one symbol data. Thus, it is preferable that characteristics (for example, received power and noise characteristics) be identical within a spread signal. Since the multiplexing number is determined for each of three units according to the present invention, despreading processing after reception can be performed appropriately while improving overall throughput.

Third Embodiment

Next, an embodiment when signal processing is performed after signals are blocked will be described as a third embodiment.

Figure 10:
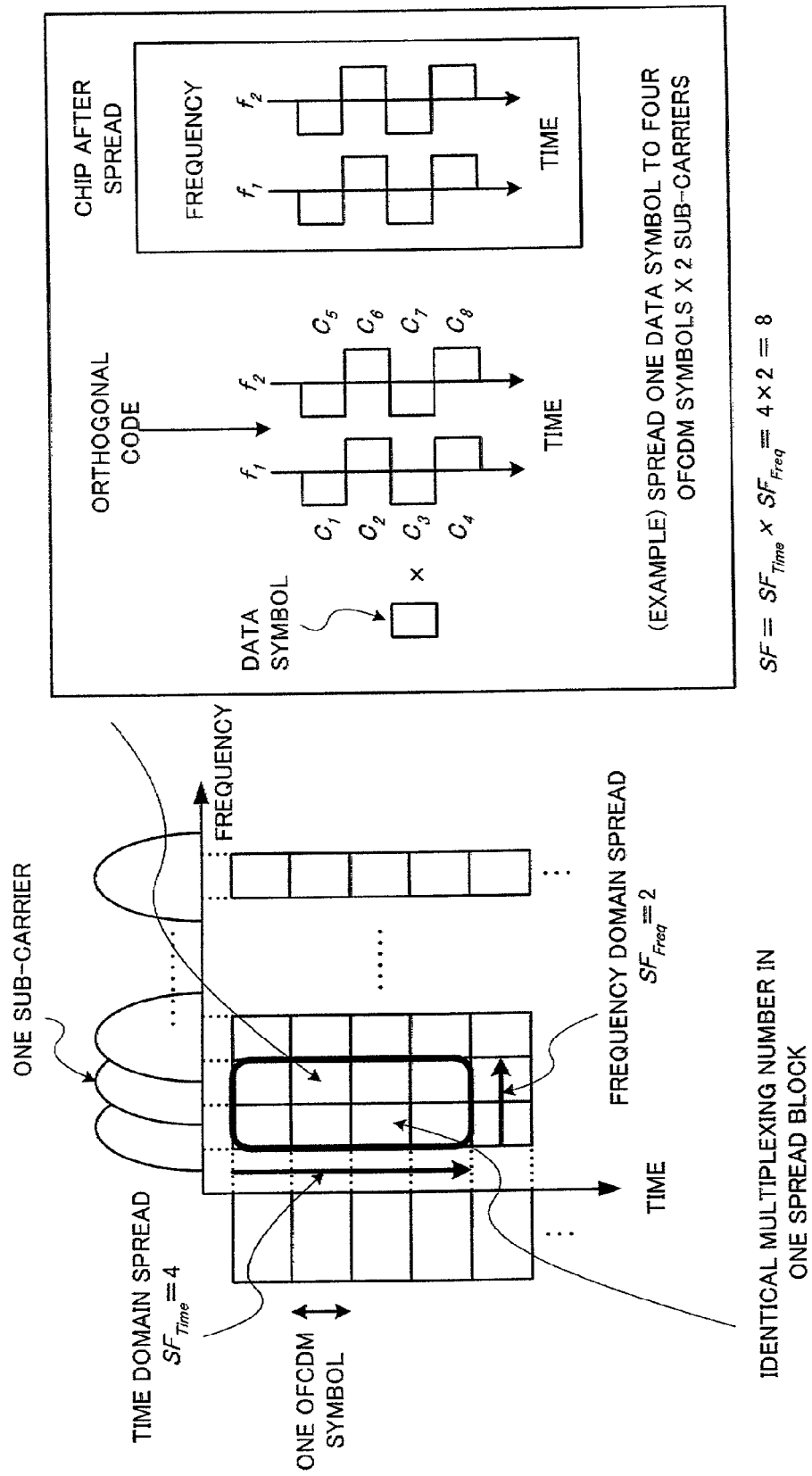
FIG. 10 is a diagram showing a state in which multiplexing is performed with the same multiplexing number in one spread block in a third embodiment.

One example is a case in which signals are blocked in time and frequency like VSF-OFCDM, which is a variant of the MC-CDMA. This is shown in FIG. 10 (NTT DoCoMo Technical Journal Vol. 11, No. 2, P24). In this system, spread block is performed as a product of the frequency axis and time axis and processing is also performed in this unit. In FIG. 10, one spread block is formed by frequency axis 2 (2 sub-carriers as a frequency domain) and time axis 4 (4 OFCDM symbols as a time domain). In this case, the same multiplexing number is assumed in block units in the present invention.

Figure 11:
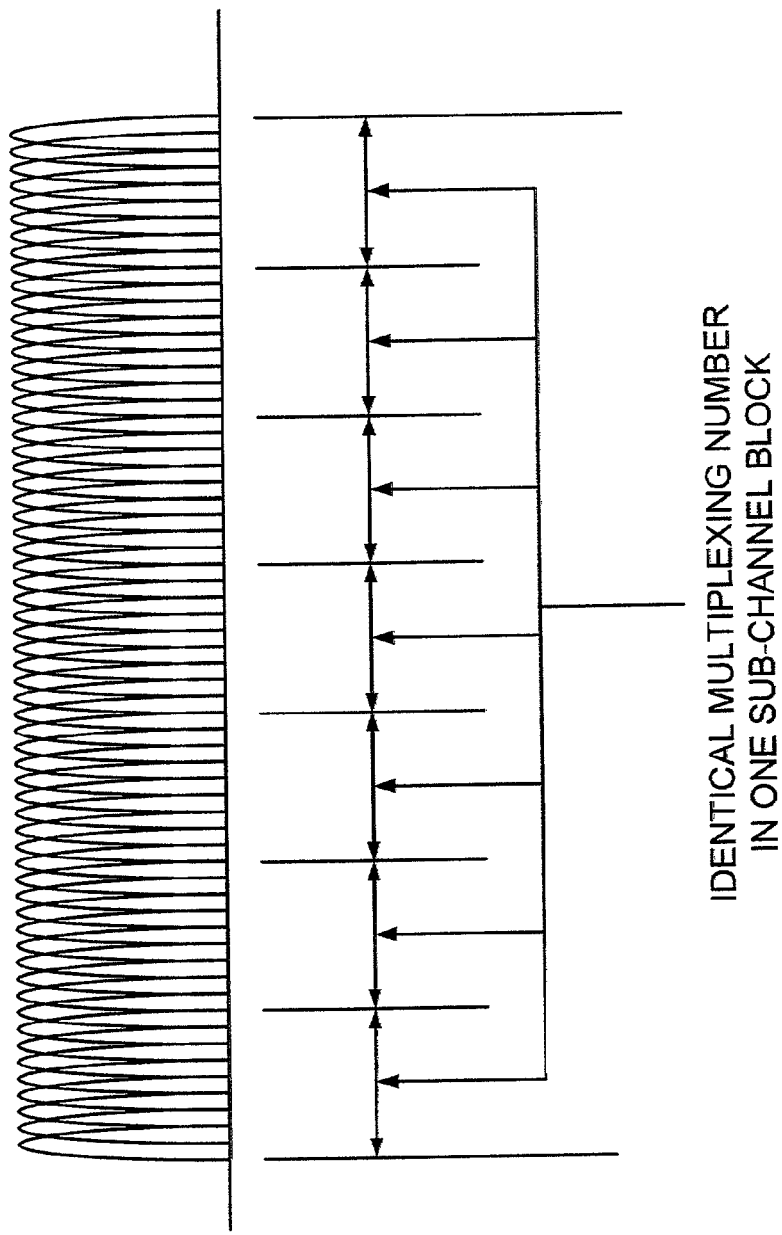
FIG. 11 is a diagram showing a state in which multiplexing is performed with the same multiplexing number in one sub-channel block in the third embodiment.

Another example is a case in which sub-carriers are blocked in advance in basic units for the purpose of achieving OFDMA. This is shown in FIG. 11. In this example, all sub-carriers are divided into seven blocks. Since processing is performed in block units in this case, the same multiplexing number is assumed in block units.

In a system in which sub-carriers are blocked for signal processing as described above, the same multiplexing number applies within the processing block by multiplexing in the block units, which is convenient for processing.

That is, if signal processing of a transmission signal is performed in the block units, the multiplexing number is determined in the block units and thus decoding processing can be performed appropriately in the block units on the receiving side while improving overall throughput.

Fourth Embodiment

Next, processing in a transmitter/receiver will be described. Since whether multiplexed or not for each sub-carrier in advance is known on the receiver side, processing of synthesis and demodulation is performed after reception only for sub-carriers to which identical signals are allocated.

Figure 12:
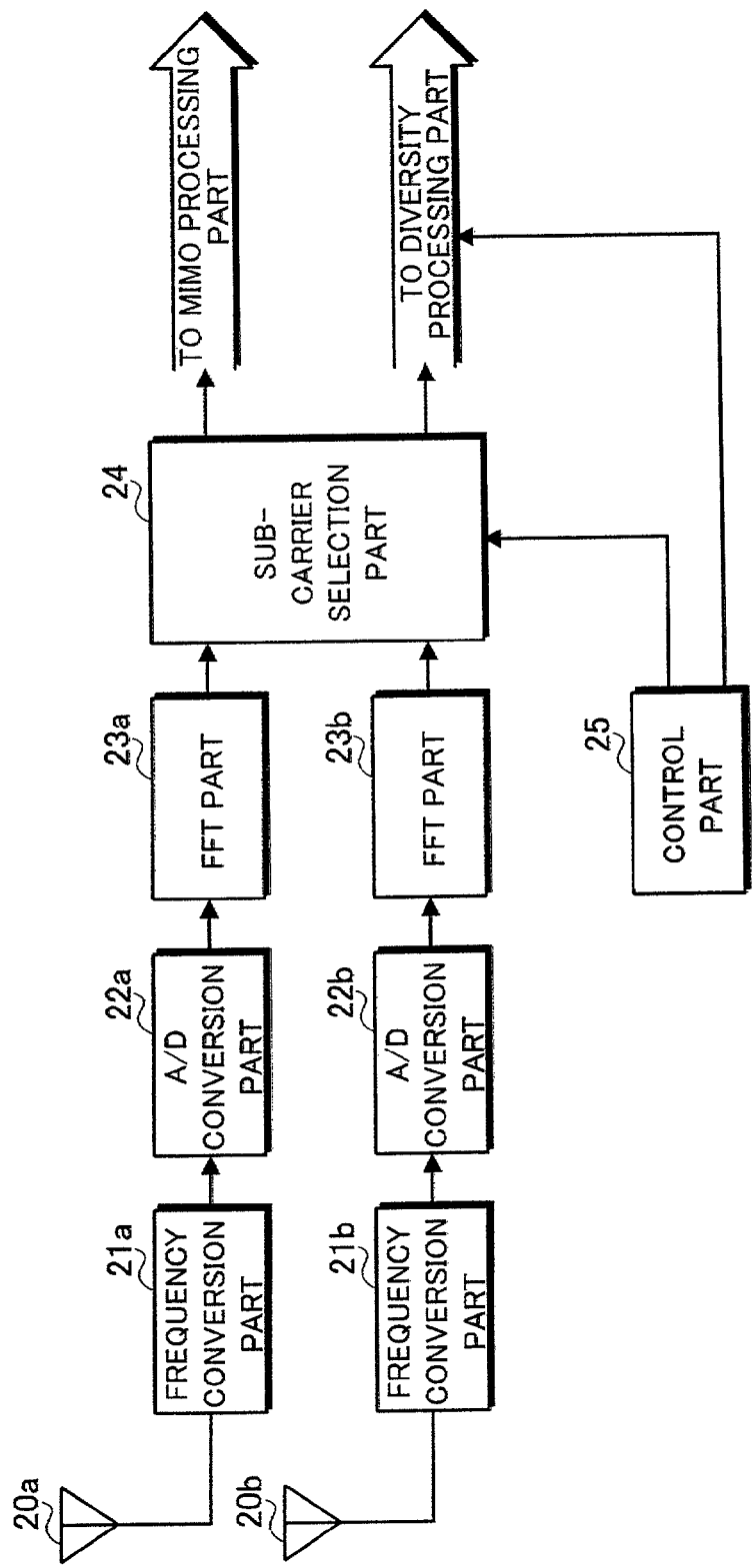
FIG. 12 is a block diagram showing an outline configuration of a radio receiver according to a fourth embodiment.

FIG. 12 is a block diagram showing the outline configuration of the receiver. A transmission signal is received by antennas 20a and 20b and a radio signal is converted to an electric signal by frequency conversion parts 21a and 21b. Conversion from an analog signal to a digital signal is performed by A/D conversion part 22a and 22b and Fourier transform processing is performed by FFT parts 23a and 23b. A sub-carrier selection part 24 is controlled by a control part 25 and selects one of MIMO processing and diversity processing for each sub-carrier for output.

Diversity in which signals to be received are received by multiple RF circuits or the like for synthesis is well-known as a known technology and, in the fourth embodiment, characteristics can be improved by performing MIMO processing of multiplexed signals and diversity processing of non-multiplexed signals.

Since conventional diversity reception requires multiple receiving systems and an improvement factor is not evident considering a relatively heavy burden on the circuit (for example, about 2 dB in a 2-system reception system and about 3 dB in a 3-system reception system), such conventional diversity reception has been in practical use only in part of applications. In contrast, according to the fourth embodiment, since multiple receiving RF signal systems are originally provided for MIMO processing, characteristics can advantageously be improved with no increase in burden on the circuit.

Fifth Embodiment

In a fifth embodiment, if a sub-carrier is not to be multiplexed or the multiplexing number is small when performing sub-carrier modulation, amplitude adjustments, which correspond to a decrease in transmission power on the transmitting side, are made.

Figure 13:
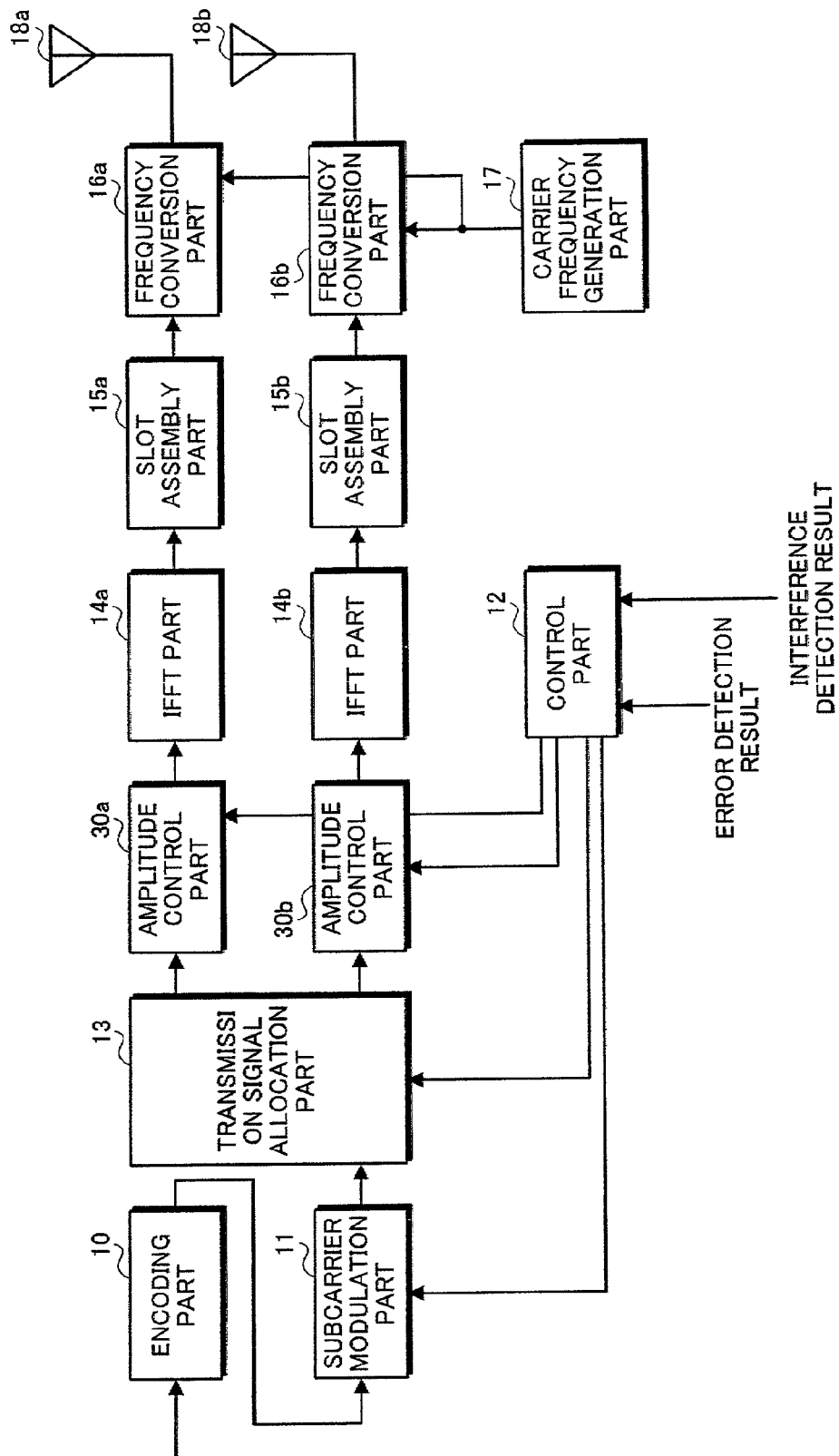
FIG. 13 is a block diagram showing an outline configuration of a radio transmission device according to a fifth embodiment.
Figure 14:
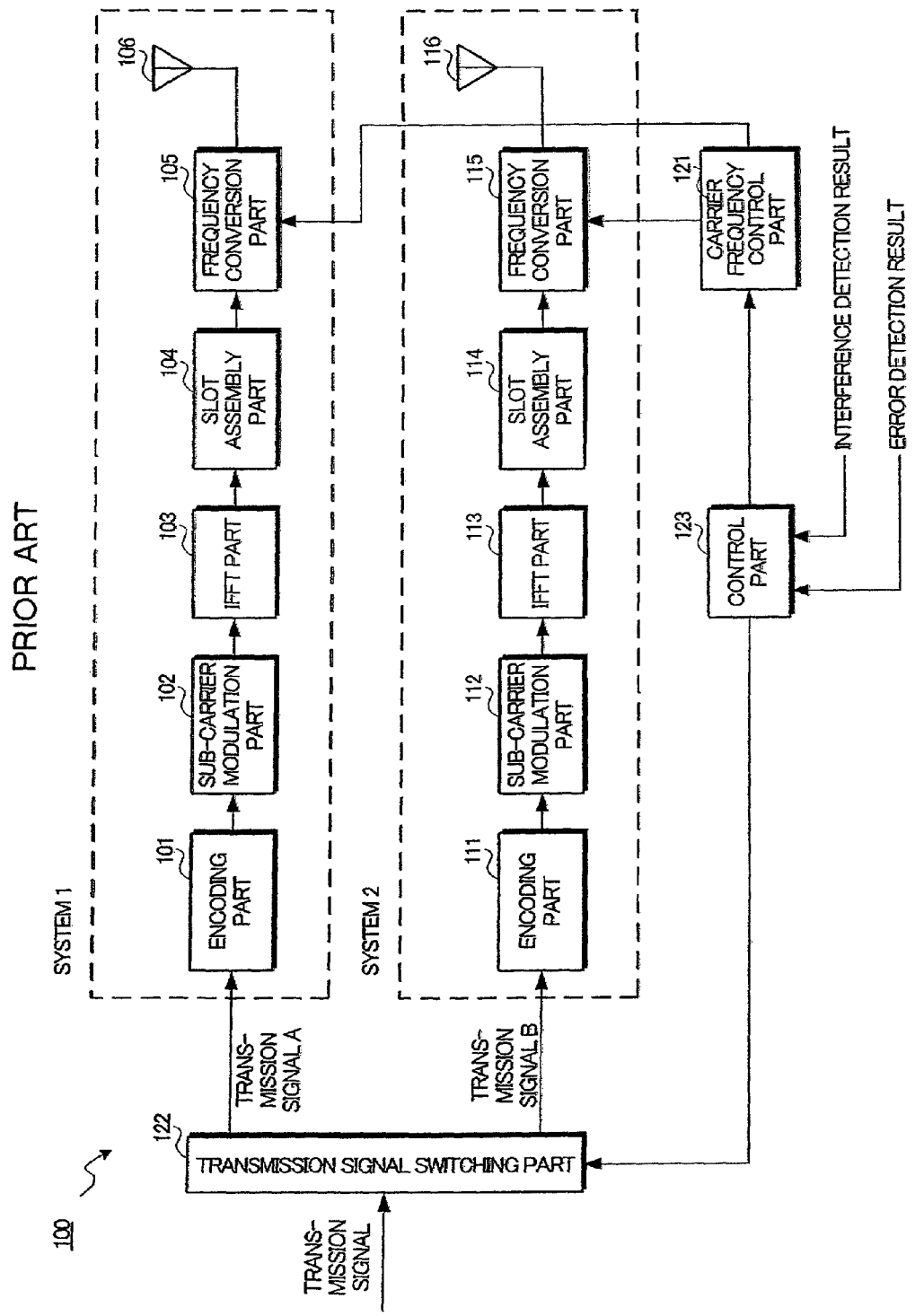
FIG. 14 is a block diagram showing an outline configuration of a conventional radio transmission device.
Figure 15:
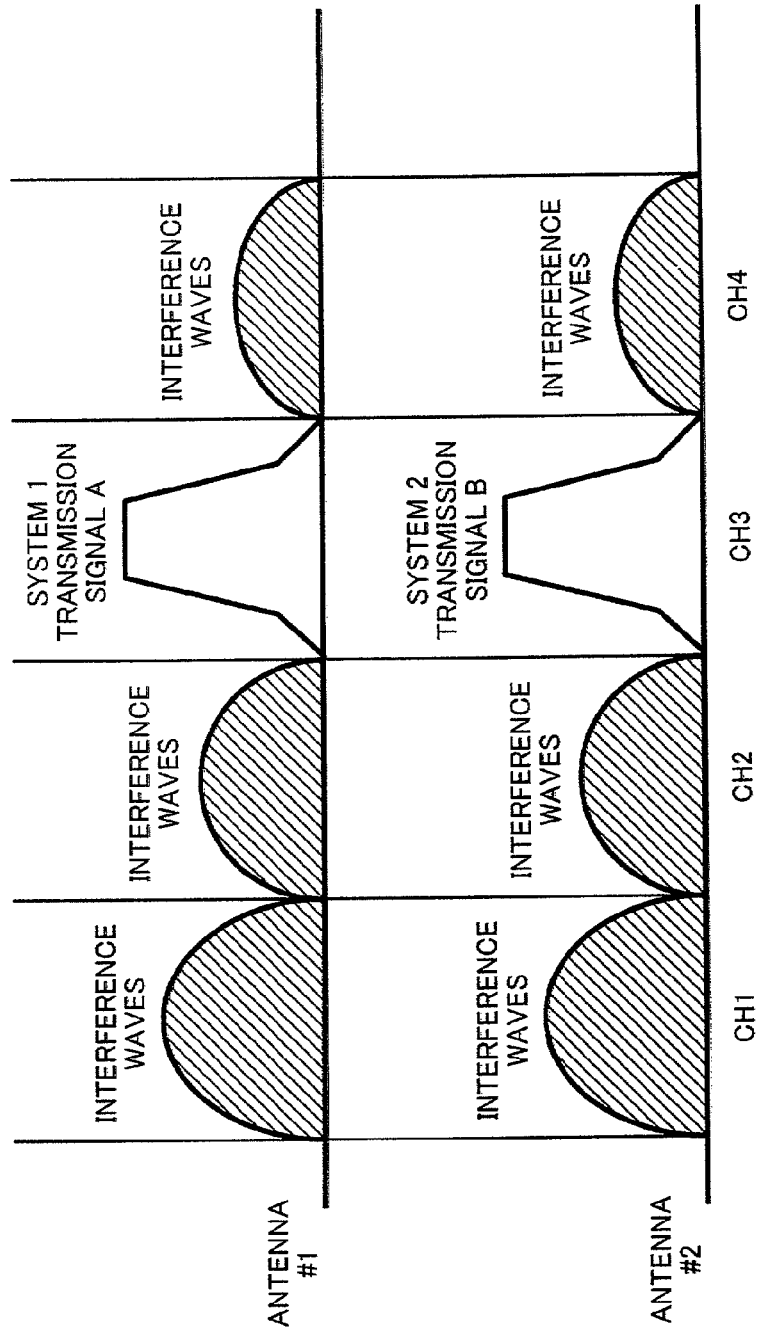
FIG. 15 is a diagram showing a relationship between each transmitting antenna and transmission signals in the conventional transmitter.
Figure 16:
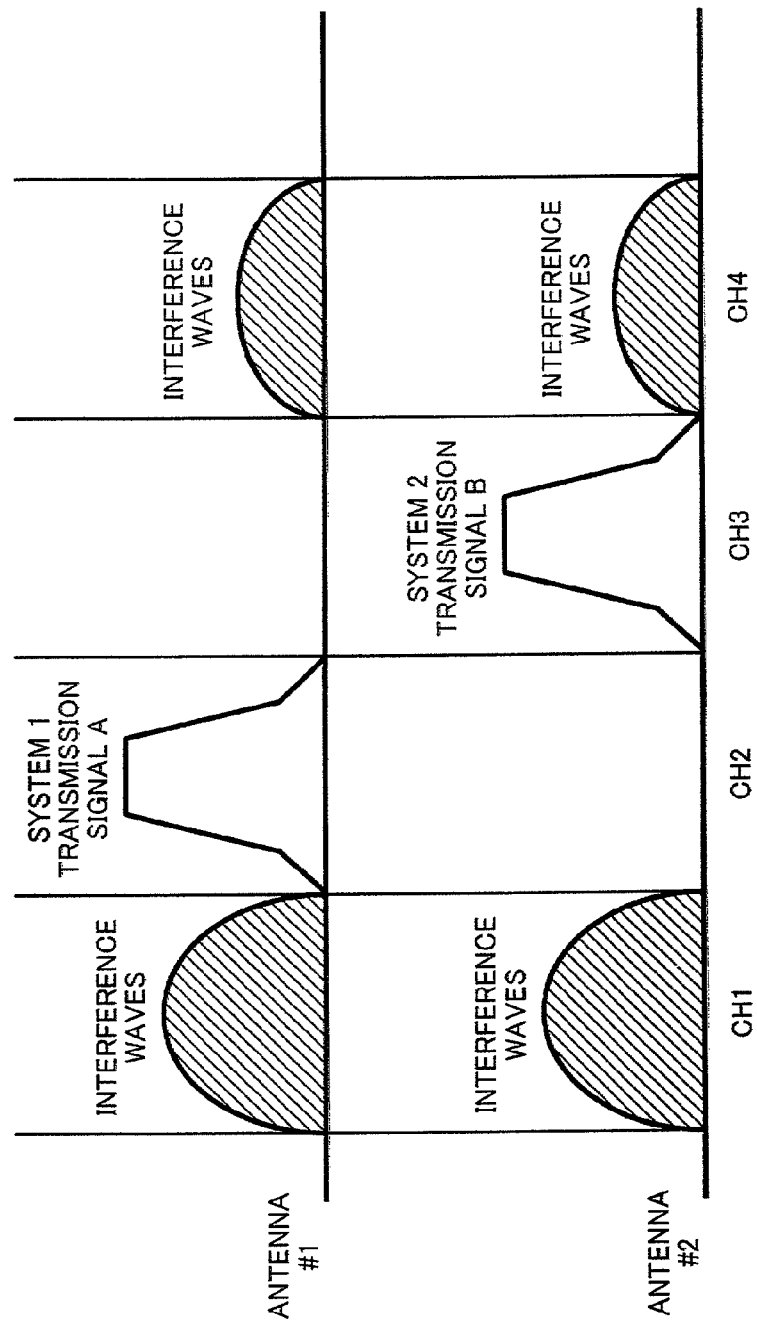
FIG. 16 is a diagram showing the relationship between each transmitting antenna and transmission signals in the conventional transmitter.
Figure 17:
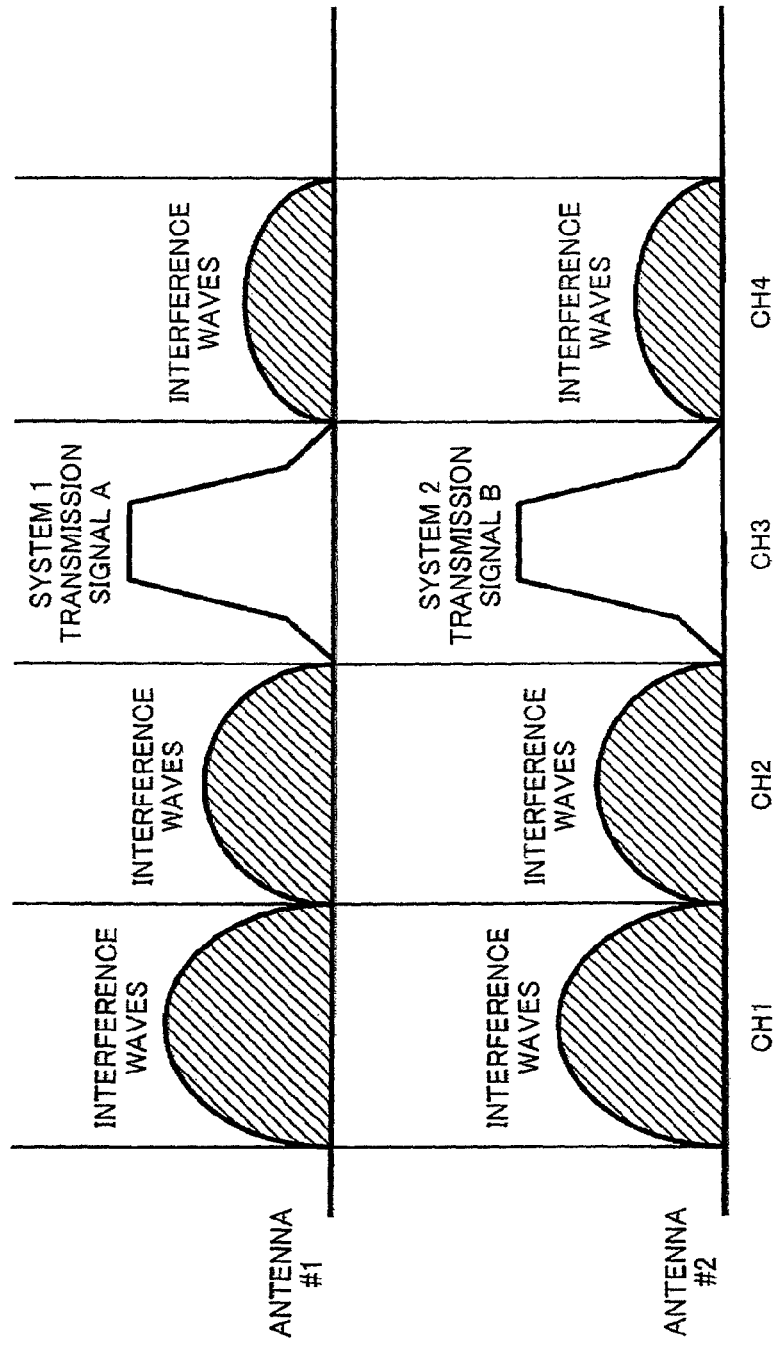
FIG. 17 is a diagram showing the relationship between each transmitting antenna and transmission signals in the conventional transmitter.
Figure 18:
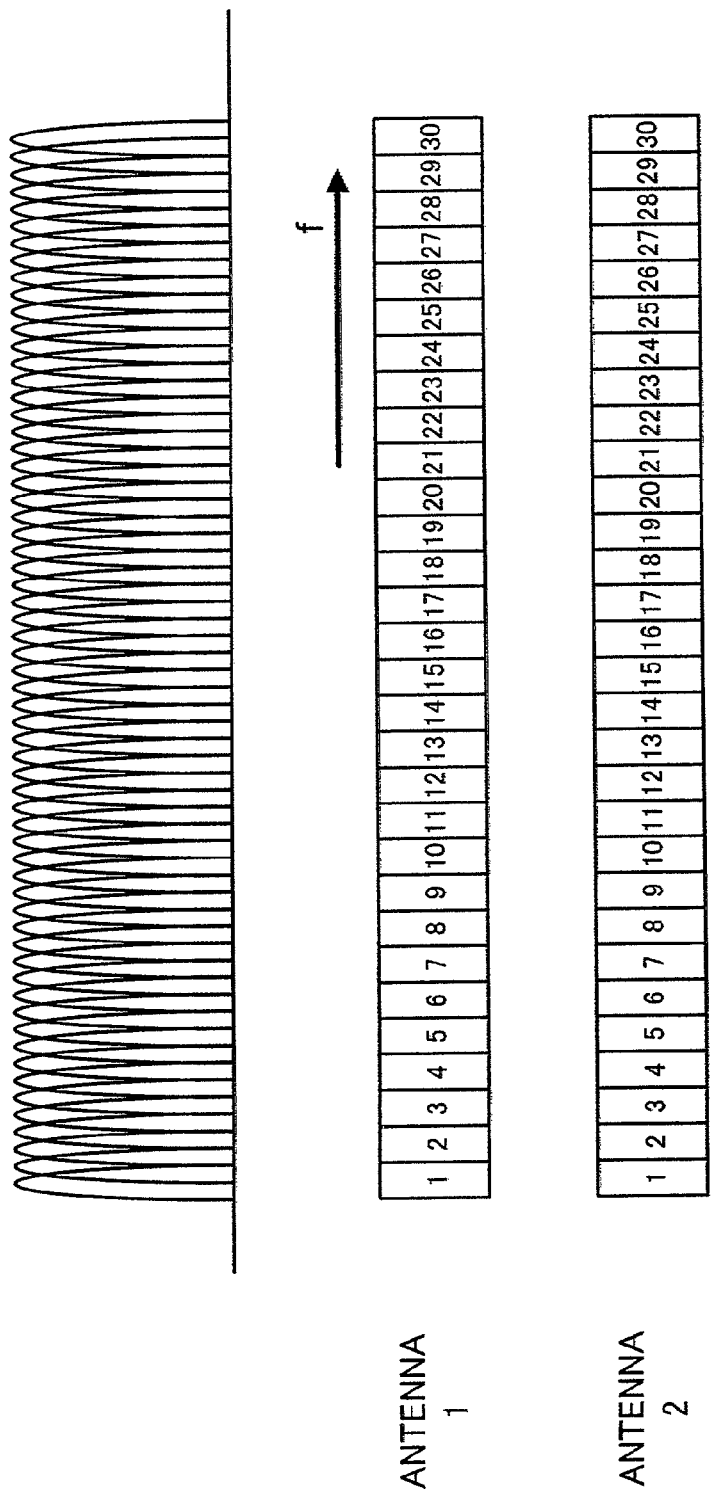
FIG. 18 is a diagram showing a state in which a transmission signal is allocated to each sub-carrier in the conventional transmitter.
Figure 19:
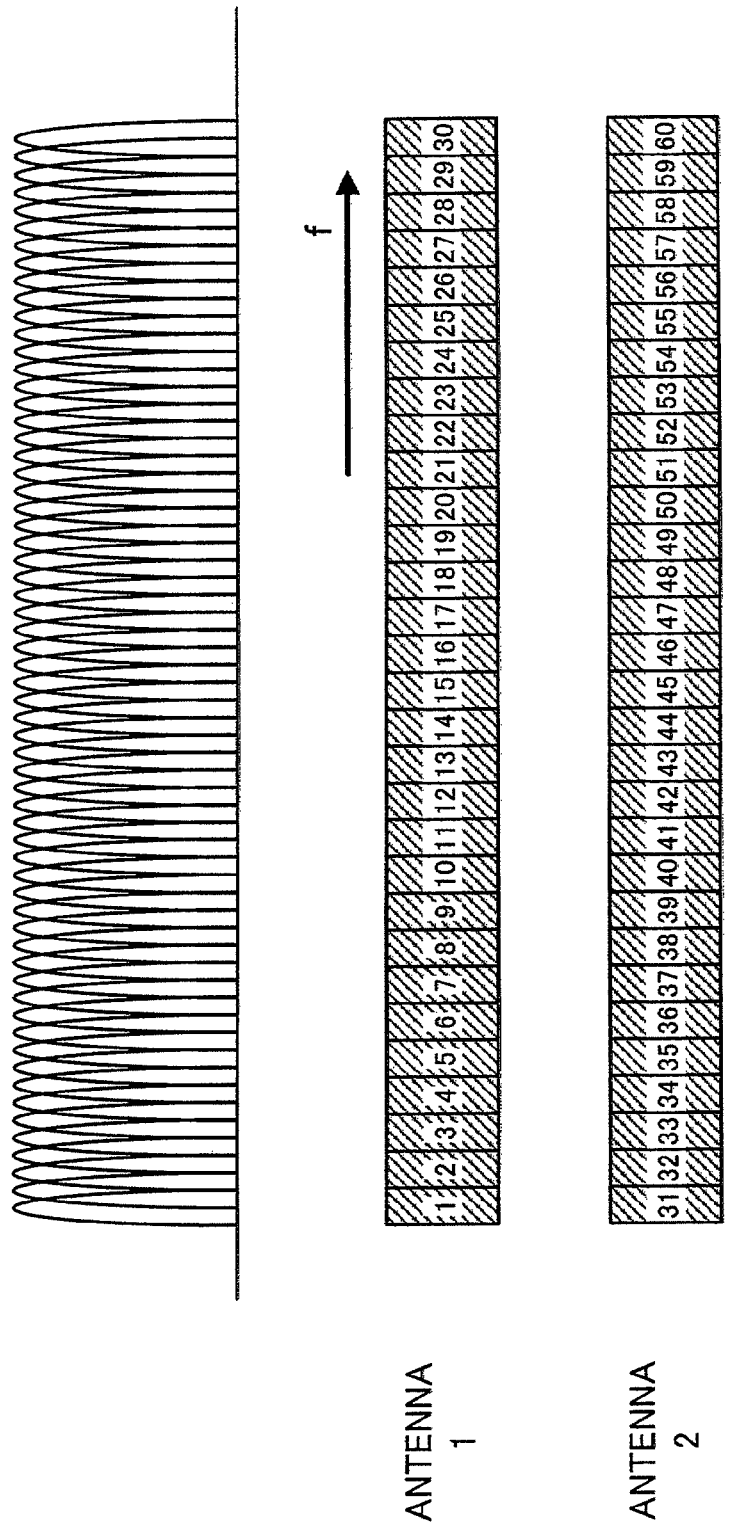
FIG. 19 is a diagram showing a state in which a transmission signal is allocated to each sub-carrier in the conventional transmitter.

FIG. 13 is a block diagram showing the outline configuration of a radio transmission device according to the fifth embodiment. Encoding processing of a transmission signal is performed by the encoding part 10. Next, modulation of the transmission signal is performed for each sub-carrier by the sub-carrier modulation part 11. The control part 12 determines, based on information received from another radio communication device as an opposite party, the multiplexing number for performing spatial multiplexing for each sub-carrier using, for example, error detection results and interference detection results and outputs the determined multiplexing number to the sub-carrier modulation part 11 and the transmission signal allocation part 13.

The transmission signal allocation part 13 transfers signals in the number corresponding to the number of sub-carriers to be processed by two amplitude control parts 30*a* and 30*b* to the amplitude control parts 30*a* and 30*b*. For example, if a system has 768 sub-carriers, signals for the 768 sub-carriers will each be transferred. These amplitude control parts 30*a* and 30*b* adjust transmission power by adjusting amplitudes of the transmission signal. In the slot assembly parts 15*a* and 15*b*, a guard time, a preamble part and the like are added to the signals that have been converted to time waveforms by the IFFT parts 14*a* and 14*b* to create a slot configuration to be transmitted. Next, the transmission signal is converted to RF frequencies by the frequency conversion parts 16*a* and 16*b* based on frequencies generated by the carrier frequency generation part 17 to be transmitted from the antennas 18*a* and 18*b*.

In the fifth embodiment, if there are two transmission systems and an identical signal is transmitted without multiplexing, twice as much power will be needed. Thus, the signal can be transmitted by adjusting the signal power to a level equivalent to that of a multiplexed signal. Therefore, it becomes possible to halve power from each of the transmission systems or eliminate power of one transmission system for sub-carriers transmitting an identical signal. Improvement can also be expected by performing the diversity reception, and power reduction from the improvement is also possible. Moreover, further improvement effects can be expected by controlling power on the transmitting side by the technique of transmission diversity.

Since, if any two or more of the transmitting antennas transmit an identical transmission signal, transmission power of each transmitting antenna that transmits the identical transmission signal is reduced, as described above, an increase in power when the identical transmission signal is transmitted can be prevented so that appropriate transmission power is used for transmission. Also, it is effective, like the fifth embodiment, to adopt a technique corresponding to a decrease in transmission power on the transmitting side, for example, a technique for adjusting amplitudes.

EXPLANATIONS OF NUMERALS

10: Encoding part
11: Sub-carrier modulation part
12: Control part
13: Transmission signal allocation part
14*a*, 14*b*: IFFT part
15*a*, 15*b*: Slot assembly part
16*a*, 16*b*: Frequency conversion part
17: Carrier frequency generation part
18*a*, 18*b*: Transmitting antenna
20*a*, 20*b*: Receiving antenna
21*a*, 21*b*: Frequency conversion part
22*a*, 22*b*: A/D conversion part
23*a*, 23*b*: FFT part
24: Sub-carrier selection part
25: Control part
30*a*, 30*b*: Amplitude control part

The invention claimed is:

1. A radio transmitter having a plurality of transmitting antennas, comprising:
    a determination part that determines a spatial multiplexing number for each of a plurality of block units of a transmission signal, each block unit obtained by dividing the transmission signal in time and frequency for each radio communication device as an opposite party; and
    a transmission signal allocation part that allocates each of the block units of the transmission signal to a number of said plurality of transmitting antennas according to the spatial multiplexing number determined for each block unit, respectively.

2. The radio transmitter according to claim 1, said radio transmitter receiving information about the spatial multiplexing number from said opposite-party radio communication device.

3. The radio transmitter according to claim 1, wherein
    said transmission signal is composed of continuous symbols, and
    when said spatial multiplexing number is two, said transmission signal allocation part allocates the symbols alternately between two of the plurality of transmitting antennas.

4. The radio transmitter according to claim 2, wherein
    said transmission signal is composed of continuous symbols, and
    when said spatial multiplexing number is two, said transmission signal allocation part allocates the symbols alternately between two of the plurality of transmitting antennas.

5. A radio communication device having a plurality of receiving antennas for receiving a signal transmitted from the radio transmitter according to claim 1, said radio communication device transmitting information about spatial multiplexing number.

6. A radio communication device having a plurality of receiving antennas for receiving a signal transmitted from the radio transmitter according to claim 2, said radio communication device transmitting information about spatial multiplexing number.

7. A radio communication device having a plurality of receiving antennas for receiving a signal transmitted from the radio transmitter according to claim 3, said radio communication device transmitting information about spatial multiplexing number.

8. A radio communication device having a plurality of receiving antennas for receiving a signal transmitted from the radio transmitter according to claim 1, said radio communication device performing MIMO processing when said received signal is spatial multiplexed, while performing diversity processing when said received signal is not spatial multiplexed.

9. A radio communication device having a plurality of receiving antennas for receiving a signal transmitted from the radio transmitter according to claim 2, said radio communication device performing MIMO processing when said received signal is spatial multiplexed, while performing diversity processing when said received signal is not spatial multiplexed.

10. A radio communication device having a plurality of receiving antennas for receiving a signal transmitted from the radio transmitter according to claim 3, said radio communication device performing MIMO processing when said received signal is spatial multiplexed, while performing diversity processing when said received signal is not spatial multiplexed.

11. A transmission method of a radio transmitter having a plurality of transmitting antennas, comprising the steps of:
 determining a spatial multiplexing number for each of a plurality of block units of a transmission signal, each block unit obtained by dividing the transmission signal in time and frequency for each radio communication device as an opposite party; and
 allocating each of the block units of the transmission signal to a number of said plurality of transmitting antennas according to the spatial multiplexing number determined for each block unit, respectively.

12. The radio transmission method according claim 11, further comprising receiving information about spatial multiplexing number from said radio communication device.

* * * * *